United States Patent
Takahata et al.

(10) Patent No.: US 9,972,844 B2
(45) Date of Patent: May 15, 2018

(54) LITHIUM-ION SECONDARY BATTERY

(75) Inventors: Koji Takahata, Toyota (JP); Akihiro Ochiai, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 874 days.

(21) Appl. No.: 14/349,437

(22) PCT Filed: Oct. 7, 2011

(86) PCT No.: PCT/JP2011/073249
§ 371 (c)(1),
(2), (4) Date: Apr. 3, 2014

(87) PCT Pub. No.: WO2013/051155
PCT Pub. Date: Apr. 11, 2013

(65) Prior Publication Data
US 2014/0248528 A1    Sep. 4, 2014

(51) Int. Cl.
*H01M 4/133* (2010.01)
*H01M 4/587* (2010.01)
(Continued)

(52) U.S. Cl.
CPC .......... *H01M 4/587* (2013.01); *H01M 4/133* (2013.01); *H01M 4/1393* (2013.01);
(Continued)

(58) Field of Classification Search
CPC ............................ H01M 4/133; H01M 4/1393
(Continued)

(56) References Cited

U.S. PATENT DOCUMENTS

| | | |
|---|---|---|
| 2002/0182492 A1 | 12/2002 | Kimura et al. |
| 2007/0196737 A1* | 8/2007 | Ohata ............ H01M 2/145 429/246 |
| 2010/0092869 A1 | 4/2010 | Kaneko et al. |

FOREIGN PATENT DOCUMENTS

| | | |
|---|---|---|
| CN | 2574229 Y | 9/2003 |
| CN | 101127394 A | 2/2008 |

(Continued)

OTHER PUBLICATIONS

Notice of Allowance issued in U.S. Appl. No. 14/235,463 dated Oct. 27, 2015.
Office Action for U.S. Appl. No. 14/235,463 dated Jul. 15, 2015.

*Primary Examiner* — Jonathan G Leong
(74) *Attorney, Agent, or Firm* — Finnegan, Henderson, Farabow, Garrett & Dunner, LLP

(57) ABSTRACT

A negative electrode active material layer (243A) of a lithium-ion secondary battery (100A) contains natural graphite and artificial graphite as negative electrode active material particles. The negative electrode active material layer (243A) has a region (A1) facing the positive electrode active material layer (223) and regions (A2, A3) not facing the positive electrode active material layer (223). The region (A1) facing the positive electrode active material layer (223) contains the natural graphite in a larger proportion than the regions (A2, A3) not facing the positive electrode active material layer (223), and the regions (A2, A3) not facing the positive electrode active material layer (223) contain the artificial graphite in a larger proportion than the region (A1) facing the positive electrode active material layer (223).

9 Claims, 17 Drawing Sheets

(51) Int. Cl.
*H01M 4/1393* (2010.01)
*H01M 10/058* (2010.01)
*H01M 4/36* (2006.01)
*H01M 10/052* (2010.01)
*H01M 4/02* (2006.01)

(52) U.S. Cl.
CPC ......... *H01M 4/366* (2013.01); *H01M 10/052* (2013.01); *H01M 10/058* (2013.01); *H01M 2004/027* (2013.01); *Y02T 10/7011* (2013.01)

(58) Field of Classification Search
USPC ...................................................... 429/231.8
See application file for complete search history.

(56) References Cited

FOREIGN PATENT DOCUMENTS

| | | |
|---|---|---|
| JP | 5-290844 | 11/1993 |
| JP | 2007-242630 | 9/2007 |
| JP | 2009-64574 | 3/2009 |
| JP | 2010-097696 | 4/2010 |
| WO | WO 2013/018182 A1 | 2/2013 |

* cited by examiner

LITHIUM-ION SECONDARY BATTERY

CROSS-REFERENCE TO RELATED APPLICATIONS

This application is a national phase application of International Application No. PCT/JP2011/073249, filed Oct. 7, 2011, the content of which is incorporated herein by reference.

TECHNICAL FIELD

The present invention relates to lithium-ion secondary batteries.

In the present description, the term "secondary battery" refers to a rechargeable storage device in general, which encompasses what is called storage batteries, such as lithium secondary batteries (typically lithium-ion secondary batteries) and nickel-metal hydride batteries. In the present description, the term "active material" refers to a substance capable of reversibly absorbing and releasing (typically inserting and deinserting) a chemical species that serves as a charge carrier (e.g., lithium ions in the case of lithium-ion secondary batteries).

BACKGROUND ART

JP H05(1993)-290844 A, for example, discloses that, in a lithium secondary battery using a $LiPF_6$-containing electrolyte solution, a mixture of natural graphite and artificial graphite is used as a negative electrode material capable of absorbing and releasing lithium. The publication discloses that the mixture contains 10 weight % to 50 weight % of artificial graphite. The publication also discloses that such a configuration can inhibit the $LiPF_6$ and the carbon material from undergoing violent reactions.

JP 2009-64574 A discloses a lithium-ion secondary battery comprising a plurality of negative electrode active material layers formed on a negative electrode current collector, in which a negative electrode active material layer more distant from the negative electrode current collector shows higher charge rate performance than a negative electrode active material layer closer to the negative electrode current collector.

CITATION LIST

Patent Literature

Patent Literature 1: JP H05 (1993)-290844 A
Patent Literature 2: JP 2009-64574 A

SUMMARY OF INVENTION

Technical Problem

In the lithium-ion secondary batteries, the lithium ions released from the positive electrode are absorbed into the negative electrode during charge. In order to ensure that the negative electrode can absorb the lithium ions released from the positive electrode during charge, the width of the negative electrode active material layer is set wider than the positive electrode active material layer, from which lithium ions are released, so as to cover the positive electrode active material layer. With such a configuration, it is difficult to achieve both a low reaction resistance (battery resistance) and a high capacity retention ratio at the same time.

Solution to Problem

A lithium-ion secondary battery according to one embodiment of the present invention comprises a positive electrode current collector, a positive electrode active material layer retained on the positive electrode current collector, a negative electrode current collector, and a negative electrode active material layer retained on the negative electrode current collector and disposed so as to cover the positive electrode active material layer. The negative electrode active material layer contains natural graphite and artificial graphite as negative electrode active material particles. The negative electrode active material layer comprises a region facing the positive electrode active material layer and a region not facing the positive electrode active material layer. The region facing the positive electrode active material layer contains the natural graphite in a larger proportion than the region not facing the positive electrode active material layer, and the region not facing the positive electrode active material layer contains the artificial graphite in a larger proportion than the region facing the positive electrode active material layer. With such a configuration, the reaction resistance (battery resistance) can be kept low, and also the capacity retention ratio can be kept high.

In this case, the region of the negative electrode active material layer facing the positive electrode active material layer may contain the natural graphite in a weight proportion of equal to or greater than 90% of the total weight of the natural graphite and the artificial graphite. The region of the negative electrode active material layer not facing the positive electrode active material layer may contain the artificial graphite in a weight proportion of equal to or greater than 90% of the total weight of the natural graphite and the artificial graphite. The natural graphite may have an R value of from 0.2 to 0.6, as determined by Raman spectroscopy, and the artificial graphite has an R value of less than or equal to 0.2, as determined by Raman spectroscopy. It is also possible that the ratio (Ra/Rb) of a mean R value (Ra) and a mean R value (Rb) may be (Ra/Rb)≥1.2, where the mean R value (Ra) is the mean of the R values of the negative electrode active material particles used in the region of the negative electrode active material layer facing the positive electrode active material layer, and the mean R value (Rb) is the mean of the R values of the negative electrode active material particles used in the region of the negative electrode active material layer not facing the positive electrode active material layer. Here, the term R value means the R value as determined by Raman spectroscopy.

It is desirable that the negative electrode active material layer contain a binder, and the region of the negative electrode active material layer not facing the positive electrode active material layer contain the binder in a greater amount than the region of the negative electrode active material layer facing the positive electrode active material layer. It is desirable that the natural graphite be at least partially covered with an amorphous carbon film.

DESCRIPTION OF EMBODIMENTS

Here, an example of the structure of a lithium-ion secondary battery as a non-aqueous electrolyte secondary battery will be described first. Then, referring to the example of the structure as appropriate, a lithium-ion secondary battery according to one embodiment of the present invention will be described. The parts and components that exhibit the same workings are denoted by the same reference symbols as appropriate. The drawings are depicted schematically and do not necessarily reflect actual objects. The drawings merely show examples, and they do not limit the invention unless otherwise stated.

<<Lithium-ion Secondary Battery 100>>

Figure 1:
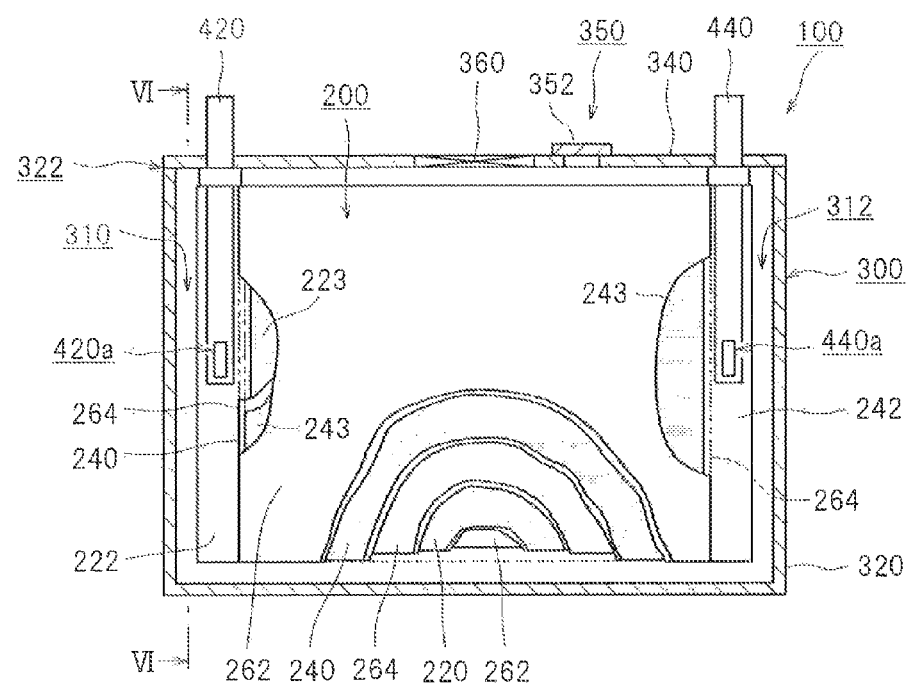
FIG. 1 is a view illustrating one example of the structure of a lithium-ion secondary battery.
Figure 2:
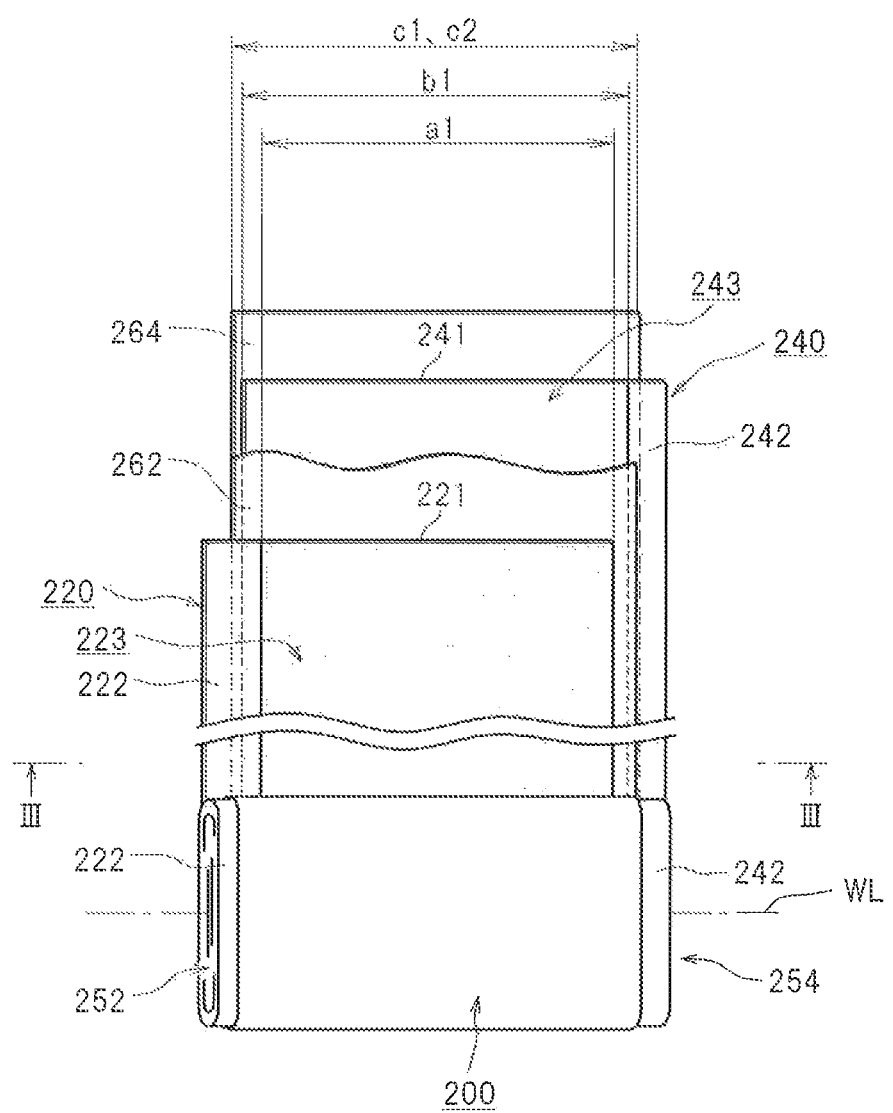
FIG. 2 is a view illustrating a wound electrode assembly of the lithium-ion secondary battery.
Figure 3:
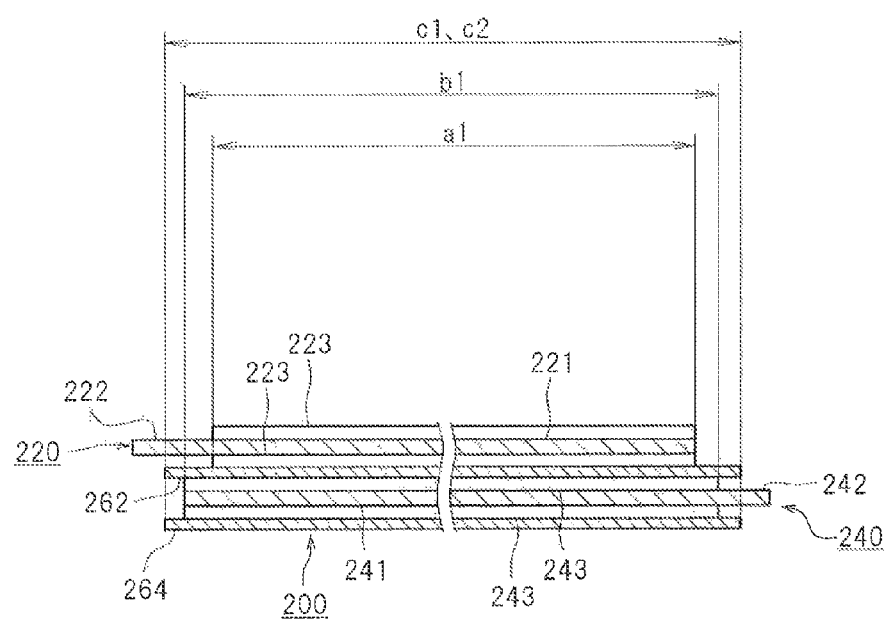
FIG. 3 is a cross-sectional view taken along line in FIG. 2.

FIG. 1 illustrates a lithium-ion secondary battery 100. As illustrated in FIG. 1, the lithium-ion secondary battery 100 has a wound electrode assembly 200 and a battery case 300. FIG. 2 is a view illustrating the wound electrode assembly 200. FIG. 3 shows a cross section taken along line III-III in FIG. 2.

As illustrated in FIG. 2, the wound electrode assembly 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 22 land a positive electrode active material layer 223. A metal foil suitable for the positive electrode may be used preferably for the positive electrode current collector 221. For the positive electrode current collector 221, it is possible to use, for example, a strip-shaped aluminum foil having a predetermined width and a thickness of about 15 μm. An uncoated portion 222 is provided along one lateral-side edge of the positive electrode current collector 221. As illustrated in FIG. 3, the positive electrode active material layer 223 is retained on both faces of the positive electrode current collector 221 except for the uncoated portion 222, which is provided in the positive electrode current collector 221, in the example shown in the figure. The positive electrode active material layer 223 contains a positive electrode active material. The positive electrode mixture layer 223 is formed by coating a positive electrode mixture containing the positive electrode active material onto the positive electrode current collector 221.

<<Positive Electrode Active Material Layer 223 and Positive Electrode Active Material Particles 610>>

Figure 4:
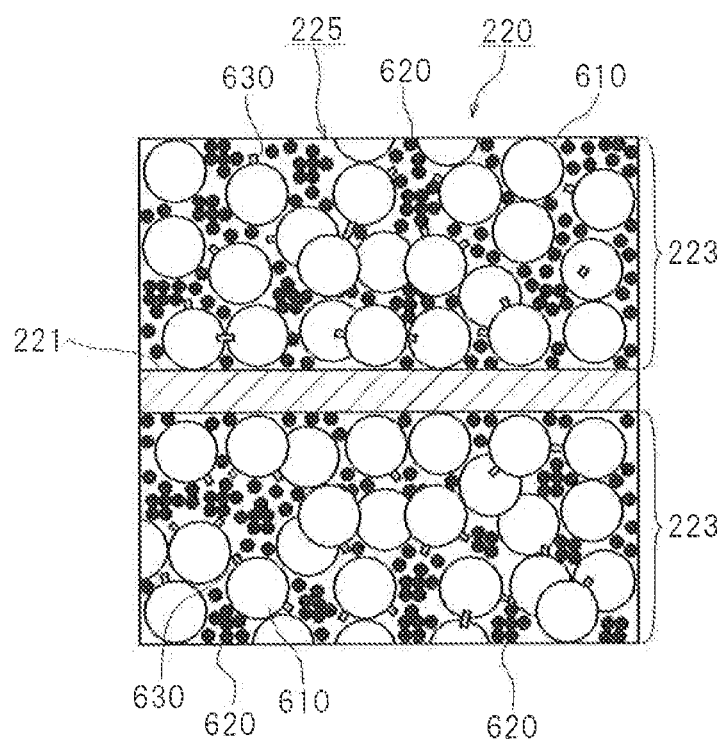
FIG. 4 is a cross-sectional view illustrating the structure of a positive electrode active material layer.

Here, FIG. 4 is a cross-sectional view of the positive electrode sheet 220. In FIG. 4, positive electrode active material particles 610, conductive agent 620, and binder 630 in the positive electrode active material layer 223 are enlarged schematically so that the structure of the positive electrode active material layer 223 can be shown clearly. As illustrated in FIG. 4, the positive electrode active material layer 223 contains the positive electrode active material particles 610, the conductive agent 620, and the binder 630.

Various types of substances that can be used as the positive electrode active material of lithium-ion secondary batteries may be used for the positive electrode active material particles 610. Examples of the positive electrode active material particles 610 include lithium transition metal oxides, such as $LiNiCoMnO_2$ (lithium-nickel-cobalt-manganese composite oxide), $LiNiO_2$ (lithium nickel oxide), $LiCoO_2$ (lithium cobalt oxide), $LiMn_2O_4$ (lithium manganese oxide), and $LiFePO_4$ (lithium iron phosphate). Here, $LiMn_2O_4$ may have, for example, a spinel structure. $LiNiO_2$ and $LiCoO_2$ may have a layered rock-salt structure. $LiFePO_4$ may have, for example, an olivine structure. The $LiFePO_4$ with an olivine structure may have, for example, particles in the range of nanometers. The $LiFePO_4$ with an olivine structure may further be coated with a carbon film.

<<Conductive Agent 620>>

Examples of the conductive agent 620 include carbon materials, such as carbon powder and carbon fiber. As the conductive agent 620, it is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder 630>>

The binder 630 serves to bond the particles of the positive electrode active material particles 610 and the conductive agent 620 contained in the positive electrode active material layer 223 with each other, and to bond these particles with the positive electrode current collector 221. As the binder 630, it is possible to use polymers that can be dissolved or dispersed in the solvent used. For example, for the positive electrode mixture composition using an aqueous solvent, it is preferable to use water-soluble or water-dispersible polymers, including: cellulose-based polymers (such as carboxymethylcellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). For the positive electrode mixture composition using a non-aqueous solvent, it is preferable to use polymers (such as polyvinylidene fluoride (PVDF), polyvinylidene chloride (PVDC), and polyacrylonitrile (PAN)).

<<Thickening Agent and Solvent>>

The positive electrode active material layer 223 is formed, for example, in the following manner: the positive electrode active material particles 610 and the conductive agent 620 mentioned above are mixed into a paste form (slurry form) in a solvent to prepare a positive electrode mixture, which is then coated onto the positive electrode current collector 221, dried, and pressure-rolled. In this case, either an aqueous solvent or a non-aqueous solvent can be used as the solvent for the positive electrode mixture. A preferable example of the non-aqueous solvent is N-methyl-2-pyrrolidone (NMP). The above-mentioned examples of the polymer materials used as the binder 630 can also be used for the purpose of obtaining the function as an addition agent, such as a thickening agent for the positive electrode mixture, in addition to the function as the binder.

It is preferable that the mass ratio of the positive electrode active material in the entire positive electrode mixture be about 50 wt. % or more (typically from 50 wt. % to 95 wt. %), and generally more preferably from about 70 wt. % to about 95 wt. % (e.g., from 75 wt. % to 90 wt. %). The proportion of the conductive agent in the entire positive electrode mixture may be from about 2 wt. % to about 20 wt. %, and generally preferably from about 2 wt. % to about 15 wt. %. In a composition that uses a binder, the proportion of the binder in the entire positive electrode mixture may be from about 1 wt. % to about 10 wt. %, and generally preferably from about 2 wt. % to about 5 wt. %.

<<Negative Electrode Sheet 240>>

As illustrated in FIG. 2, the negative electrode sheet 240 has a strip-shaped negative electrode current collector 241 and a negative electrode active material layer 243. A metal foil suitable for the negative electrode may be used preferably for the negative electrode current collector 241. A strip-shaped copper foil having a predetermined width and a thickness of about 10 μm is used for this negative electrode current collector 241. An uncoated portion 242 is provided along one lateral-side edge of the negative electrode current collector 241. The negative electrode active material layer 243 is formed on both faces of the negative electrode current collector 241 except for the uncoated portion 242, which is provided in the negative electrode current collector 241. The negative electrode mixture layer 243 is retained by the negative electrode current collector 241, and contains at least a negative electrode active material. In the negative electrode active material layer 243, a negative electrode mixture containing a negative electrode active material is coated on the negative electrode current collector 241.

<<Negative Electrode Active Material Layer 243>>

Figure 5:
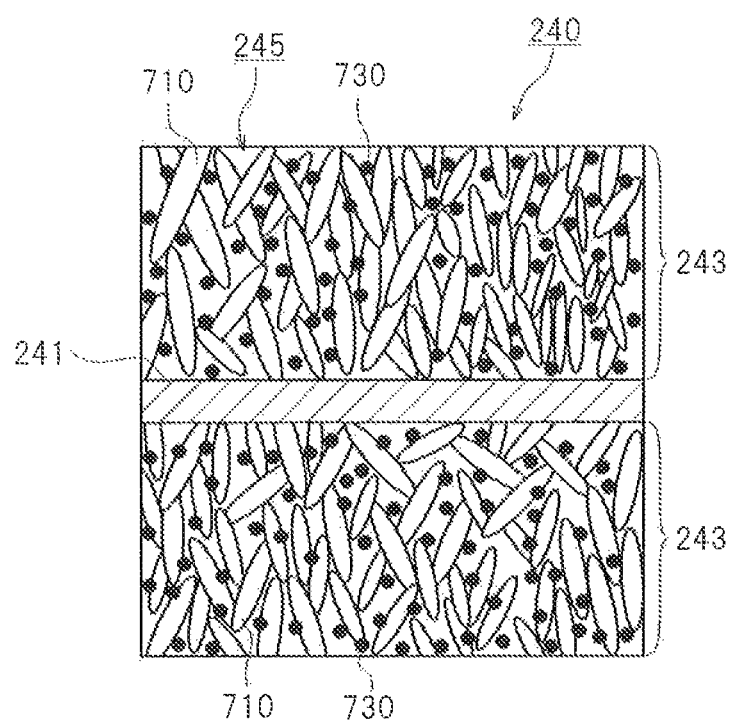
FIG. 5 is a cross-sectional view illustrating the structure of a negative electrode active material layer.

FIG. 5 is a cross-sectional view of the negative electrode sheet 240 of the lithium-ion secondary battery 100. As illustrated in FIG. 5, the negative electrode active material layer 243 contains negative electrode active material particles 710, a thickening agent (not shown), a binder 730, and the like. In FIG. 5, the negative electrode active material particles 710 and the binder 730 in the negative electrode active material layer 243 are enlarged schematically so that the structure of the negative electrode active material layer 243 can be shown clearly.

<<Negative Electrode Active Material Particles 710>>

As the negative electrode active material particles 710, it is possible to use any conventional material used as the negative electrode active material for lithium-ion secondary batteries, either alone or in combination, without any particular limitation. Examples include particulate carbon materials (carbon particles) at least partially containing a graphite structure (a layered structure). More specifically, the negative electrode active material may be natural graphite, natural graphite coated with amorphous carbon material, graphitic materials (graphites), non-graphitizable carbons (hard carbons), graphitizable carbons (soft carbons), and combinations thereof. Here, the figure depicts a case in which what is called flake graphite is used as the negative electrode active material particle 710, but the negative electrode active material particle 710 is not limited to the example shown in the figure.

<<Thickening Agent and Solvent>>

The negative electrode active material layer 243 is formed, for example, in the following manner: the negative electrode active material particles 710 and the binder 730 mentioned above are mixed into a paste form (slurry form) in a solvent to prepare a negative electrode mixture, which is then coated onto the negative electrode current collector 241, dried, and pressure-rolled. In this case, either an aqueous solvent or a non-aqueous solvent can be used as the solvent for the negative electrode mixture. A preferable example of the non-aqueous solvent is N-methyl-2-pyrrolidone (NMP). For the binder 730, any of the polymer materials shown as the examples of the binder 630 of the above-described positive electrode active material layer 223 (see FIG. 4) may be used. The above-mentioned examples of the polymer materials used as the binder 630 of the positive electrode active material layer 223 can also be used for the purpose of obtaining the function as an addition agent, such as a thickening agent for the positive electrode mixture, in addition to the function as the binder.

<<Separators 262 and 264>>

Each of the separators 262 and 264 is a member for separating the positive electrode sheet 220 and the negative electrode sheet 240 from each other, as illustrated in FIGS. 1 and 2. In this example, each of the separators 262 and 264 is made of a strip-shaped sheet having a plurality of micropores and having a predetermined width. For the separators 262 and 264, it is possible to use, for example, a single layer separator or a multi-layered separator, which is made of porous polyolefin-based resin. In this example, as illustrated in FIGS. 2 and 3, the width b1 of the negative electrode active material layer 243 is slightly wider than the width a1 of the positive electrode active material layer 223. In addition, the width c1, c2 of the separators 262 and 264 is slightly wider than the width b1 of the negative electrode active material layer 243 (c1, c2>b1>a1).

In the example shown in FIGS. 1 and 2, each of the separators 262 and 264 is made of a sheet-shaped member. Each of the separators 262 and 264 should be a member that insulates the positive electrode sheet 223 and the negative electrode sheet 243 from each other and at the same time permits transfer of electrolyte. Therefore, the separators are not limited to sheet-shaped members. In place of the sheet-shaped member, each of the separators 262 and 264 may be made of, for example, a layer of insulative particles that are formed on a surface of the positive electrode active material layer 223 or the negative electrode active material layer 243.

The insulative particles may be made of an insulative inorganic filler (for example, a filler of metal oxide or metal hydroxide) or insulative resin particles (for example, particles of polyethylene or polypropylene).

In this wound electrode assembly 200, as illustrated in FIGS. 2 and 3, the positive electrode sheet 220 and the negative electrode sheet 240 are stacked with the separators 262 and 264 interposed therebetween, so that the positive electrode sheet 220 and the negative electrode sheet 240 face each other. More specifically, the positive electrode sheet 220, the negative electrode sheet 240, and the separators 262 and 264 are stacked in the wound electrode assembly 200 in the following order: the positive electrode sheet 220, the separator 262, the negative electrode sheet 240, and the separator 264.

In this case, the positive electrode active material layer 223 and the negative electrode active material layer 243 face each other while the separators 262 and 264 are interposed therebetween. The portion of the positive electrode current collector 221 on which the positive electrode active material layer 223 is not formed (i.e., the uncoated portion 222) protrudes from one side end of the region where the positive electrode active material layer 223 and the negative electrode active material layer 243 face each other. The portion of the negative electrode current collector 241 on which the negative electrode active material layer 243 is not formed (i.e., the uncoated portion 242) protrudes from the opposite end to the side end from which the uncoated portion 222 protrudes. In such s stacked state, the positive electrode sheet 220, the negative electrode sheet 240, and the separators 262 and 264 are wound together around a winding axis WL, which is set along a lateral direction.

<<Battery Case 300>>

In this example, as illustrated in FIG. 1, the battery case 300 is what is called a prismatic battery case, and it includes a case main body 320 and a lid 340. The case main body 320 has a closed-bottom quadrangular prismatic tubular shape, and is a flat-box-shaped case and whose one side face (upper face) is open. The lid 340 is a member that is attached to the opening of the case main body 320 (the opening in the upper face thereof) to close the opening.

For a secondary battery used for a vehicle, it is desired to improve the weight energy efficiency (the capacity of the battery per unit weight) in order to improve the fuel consumption of the vehicle. In this embodiment, a lightweight metal such as aluminum or an aluminum alloy (aluminum in this example) is employed for the case main body 320 and the lid 340, which constitute the battery case 300. This enables to improve the weight energy efficiency.

The battery case 300 has a flat rectangular internal space as the space for accommodating the wound electrode assembly 200. As illustrated in FIG. 1, the flat internal space of the battery case 300 is slightly wider than the wound electrode assembly 200. In this embodiment, the battery case 300 has the case main body in a closed-bottom quadrangular prismatic tubular shape and the lid 340 closing the opening of the case main body 340. To the lid 340 of the battery case 300, electrode terminals 420 and 440 are attached. The electrode terminals 420 and 440 penetrate through the battery case 300 (the lid 340) and stick out outside the battery case 300. The lid 340 is provided with a filling port 350 and a safety vent 360.

Figure 6:
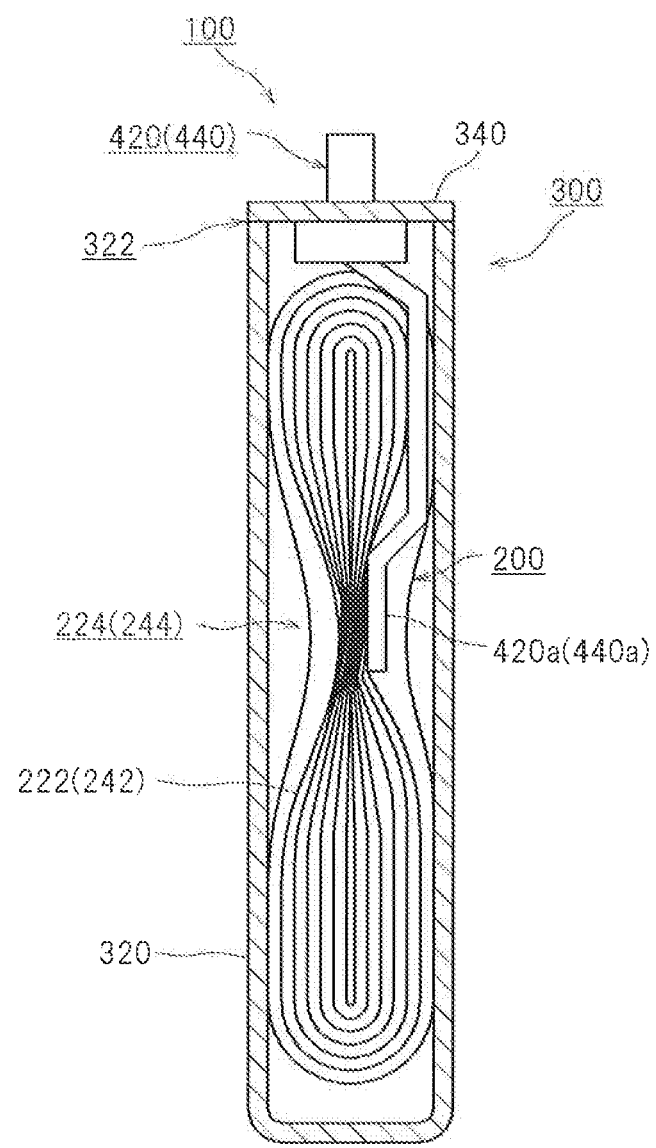
FIG. 6 is a side view illustrating a portion where an uncoated portion of the wound electrode assembly is welded to an electrode terminal.

As illustrated in FIG. 2, the wound electrode assembly 200 is deformed into a flat shape in one direction perpendicular to the winding axis WL. In the example shown in FIG. 2, the uncoated portion 222 of the positive electrode current collector 221 and the uncoated portion 242 of the negative electrode current collector 241 are exposed from the respective sides of the separators 262 and 264 in a spiral shape. As illustrated in FIG. 6, in this embodiment, the intermediate portions 224 and 244 of the uncoated portions 222 and 242 are gathered and welded to the foremost end portions 420a and 440a of the respective electrode terminals 420 and 440. In this case, from the viewpoint of the difference in materials, ultrasonic welding, for example, is used for welding the electrode terminal 420 to the positive electrode current collector 221. On the other hand, resistance welding, for example, is used for welding the electrode terminal 440 to the negative electrode current collector 241. Here, FIG. 6 is a side view illustrating the portion where the intermediate portion 224 (244) of the uncoated portion 222 (242) of the wound electrode assembly 200 is welded to the electrode terminal 420 (440), and it is also a cross-sectional view taken along line VI-VI in FIG. 1.

The wound electrode assembly 200 is attached to the electrode terminals 420 and 440 fixed to the lid 340 while it is pressed into a flat shape. As illustrated in FIG. 1, the wound electrode assembly 200 is accommodated in the flat internal space of the case main body 320. The case main body 320 is closed by the lid 340 after the wound electrode assembly 200 is placed therein. A joint portion 322 (see FIG. 1) between the lid 340 and the case main body 320 is welded and sealed by, for example, laser welding. Thus, in this example, the wound electrode assembly 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through the filling port 350 provided in the lid 340. What is called a non-aqueous electrolyte solution, which does not use water as the solvent, is used as the electrolyte solution. In this example, the electrolyte solution is an electrolyte solution in which $LiPF_6$ is contained at a concentration of about 1 mol/L in a mixed solvent of ethylene carbonate and diethyl carbonate (e.g., a mixed solvent with a volume ratio of about 1:1). Thereafter, a metal sealing cap 352 is attached (welded, for example) to the filling port 350 to seal the battery case 300. It should be noted that the electrolyte solution is not limited to the example of the electrolyte solution described herein. For example, any non-aqueous electrolyte solution that has conventionally been used for lithium-ion secondary batteries may be used as appropriate.

<<Pore>>

Here, the positive electrode active material layer 223 has tiny gaps 225, which may be called voids, for example, between the positive electrode active material particles 610 and the particles of the conductive agent 620 (see FIG. 4). The tiny gaps in the positive electrode active material layer 223 can be impregnated with the electrolyte solution (not shown). Also, the negative electrode active material layer 243 has tiny gaps, which may be called voids, for example, between the particles of the negative electrode active material particles 710 (see FIG. 5). Herein, such gaps (or voids) 225 and 245 are referred to as "pores" as appropriate. In addition, in the wound electrode assembly 200, the uncoated portions 222 and 242 are wound in a spiral form at the respective sides along the winding axis WL, as illustrated in FIG. 2. The electrolyte solution can infiltrate through the gaps in the uncoated portions 222 and 242 at the respective sides 252 and 254 along the winding axis WL. Thus, in the lithium-ion secondary battery 100, the electrolyte solution is impregnated throughout the positive electrode active material layer 223 and the negative electrode active material layer 243.

<<Gas Release Passage>>

In this example, the flat internal space of the battery case 300 is slightly wider than the wound electrode assembly 200 deformed in a flat shape. Gaps 310 and 312 are provided between the wound electrode assembly 200 and the battery case 300 at the respective sides of the wound electrode assembly 200. Each of the gaps 310 and 312 serves as a gas release passage. For example, when the temperature of the lithium-ion secondary battery 100 abnormally rises such as in the case of overcharging, it is possible that the electrolyte solution may be decomposed and gas may be generated abnormally. In this embodiment, the abnormally generated gas can move toward the safety vent 360 through the gaps 310 and 312 between the wound electrode assembly 200 and the battery case 300, and is discharged out of the battery case 300 from the safety vent 360.

In the lithium-ion secondary battery 100, the positive electrode current collector 221 and the negative electrode current collector 241 of the wound electrode assembly 200 are electrically connected to an external device via the electrode terminals 420 and 440 penetrating through the battery case 300. The operation of the lithium-ion secondary battery 100 during charge and during discharge will be described in the following.

<<Operation during Charge>>

Figure 7:
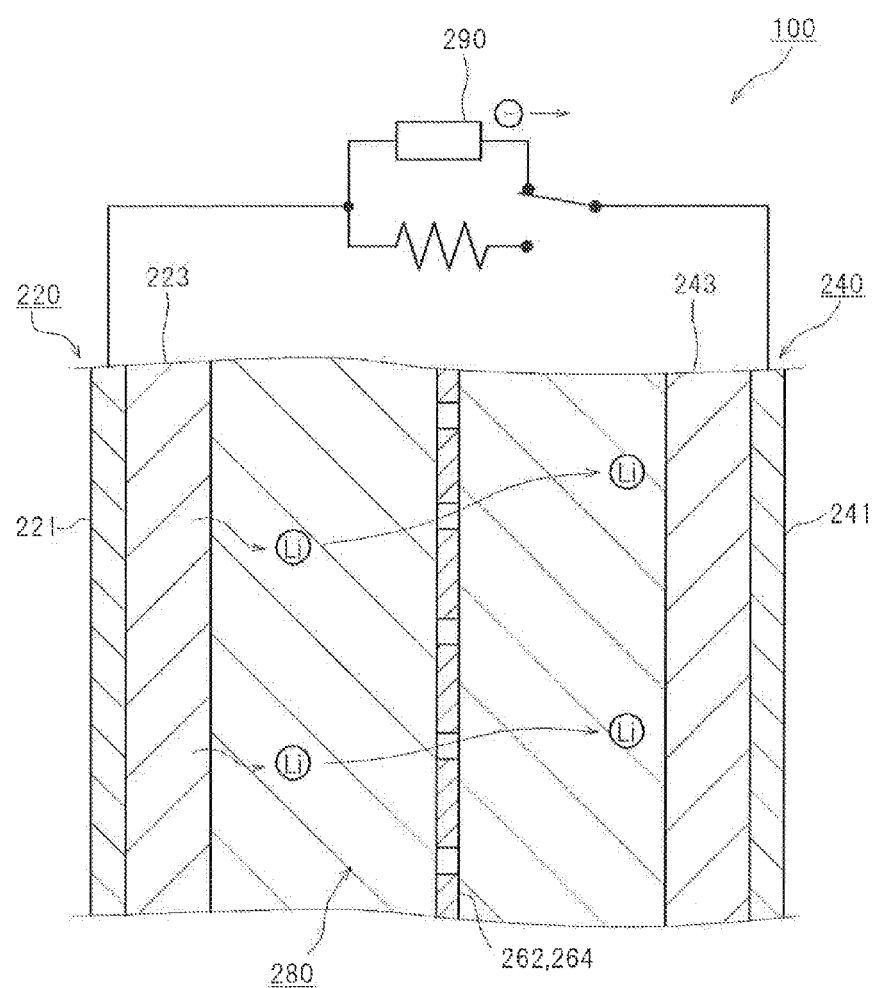
FIG. 7 is a view schematically illustrating a state of the lithium-ion secondary battery during charge.

FIG. 7 schematically illustrates the state of the lithium-ion secondary battery 100 during charge. During charge, the electrode terminals 420 and 440 (see FIG. 1) of the lithium-ion secondary battery 100 are connected to a charger 290, as illustrated in FIG. 7. By the working of the charger 290, lithium ions (Li) are released into the electrolyte solution 280 from the positive electrode active material in the positive electrode active material layer 223 during charge. In addition, electric charge is released from the positive electrode active material layer 223. The released electric charge is transferred through the conductive agent (not shown) to the positive electrode current collector 221 and further transferred through the charger 290 to the negative electrode sheet 240. In the negative electrode sheet 240, electric charge is stored, and also the lithium ions (Li) in the electrolyte solution 280 are absorbed and stored in the negative electrode active material within the negative electrode active material layer 243.

<<Operation During Discharge>>

Figure 8:
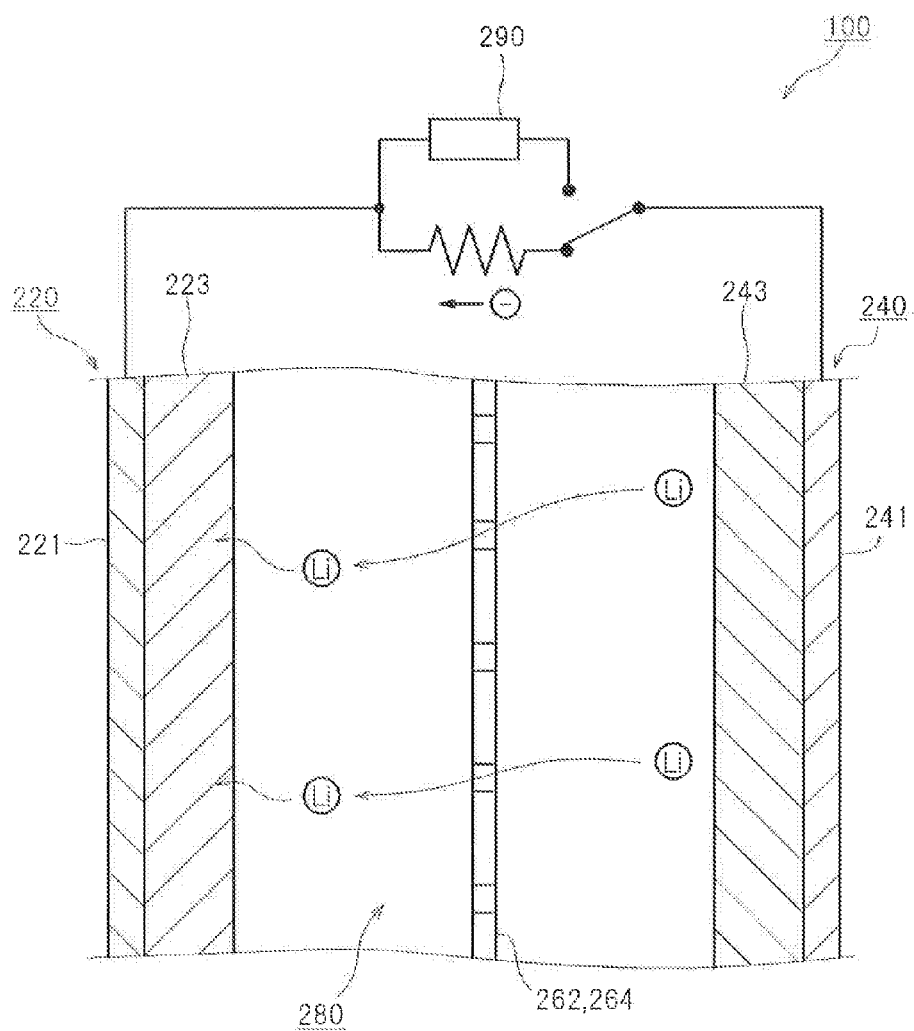
FIG. 8 is a view schematically illustrating a state of the lithium-ion secondary battery during discharge.

FIG. 8 schematically illustrates the state of the lithium-ion secondary battery 100 during discharge. During discharge, as illustrated in FIG. 8, electric charge is transferred from the negative electrode sheet 240 to the positive electrode sheet 220, and at the same time, the lithium ions stored in the negative electrode active material layer 243 are released into the electrolyte solution 280. Also, in the positive electrode, the lithium ions in the electrolyte solution 280 are absorbed into the positive electrode active material within the positive electrode active material layer 223.

Thus, in the charge and discharge of the lithium-ion secondary battery 100, lithium ions are transferred back and forth between the positive electrode active material layer 223 and the negative electrode active material layer 243 via the electrolyte solution 280. In addition, during charge, electric charge is transferred from the positive electrode active material through the conductive agent to the positive electrode current collector 221. On the other hand, during discharge, electric charge is returned from the positive electrode current collector 221 through the conductive agent to the positive electrode active material.

In the case of charge, when the transfer of lithium ions and the transfer of electrons take place more smoothly, it is believed possible to achieve more efficient and rapid charging. In the case of discharge, when the transfer of lithium ions and the transfer of electrons take place more smoothly, the resistance in the battery becomes lower and the amount of discharge becomes higher, so it is believed possible to improve the output power of the battery.

<<Other Battery Constructions>>

It should be noted that the foregoing merely shows one example of the lithium-ion secondary battery. The lithium-ion secondary battery is not limited to the foregoing embodiment. In addition, the electrode sheet in which an electrode mixture is coated on a metal foil may be used in various other types of battery constructions. For example, cylindrical batteries and laminate-type batteries are known as other types of battery constructions. The cylindrical battery is a battery in which a wound electrode assembly is enclosed in a cylindrical battery case. The laminate-type battery is a battery in which positive electrode sheets and negative electrode sheets are stacked on each other with separators interposed therebetween.

Hereinbelow, a lithium-ion secondary battery as a non-aqueous electrolyte secondary battery according to one embodiment of the present invention will be described. Herein, the same parts and components having the same functions as those of the above-described lithium-ion secondary battery 100 are denoted by the same reference signs, and the drawings of the above-described lithium-ion secondary battery 100 are referenced as necessary.

<<Lithium-ion Secondary Battery 100A>>

Figure 9:
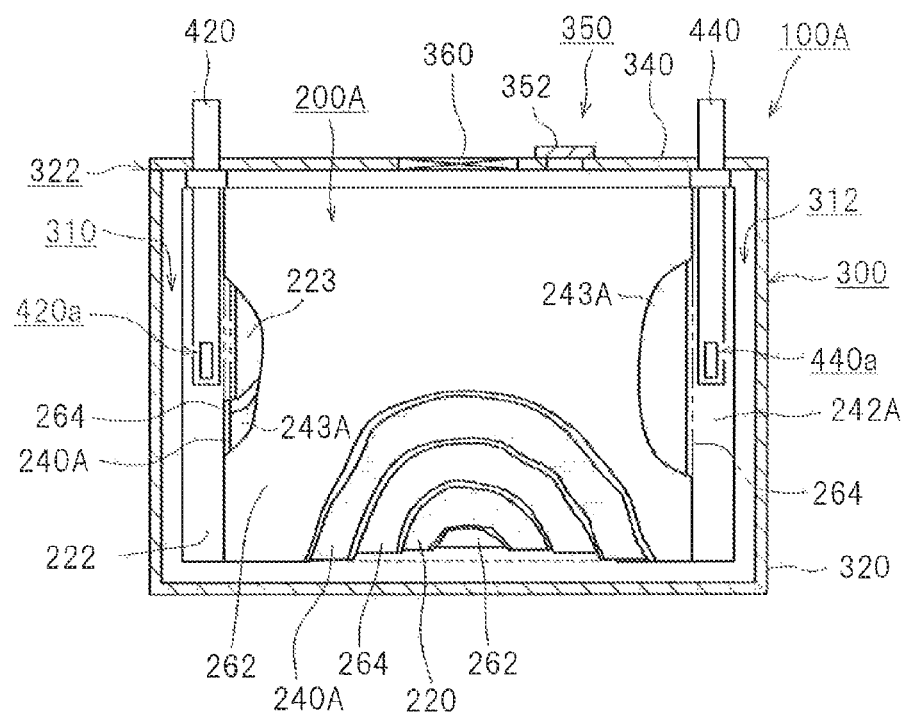
FIG. 9 is a view illustrating a lithium-ion secondary battery according to one embodiment of the present invention.
Figure 10:
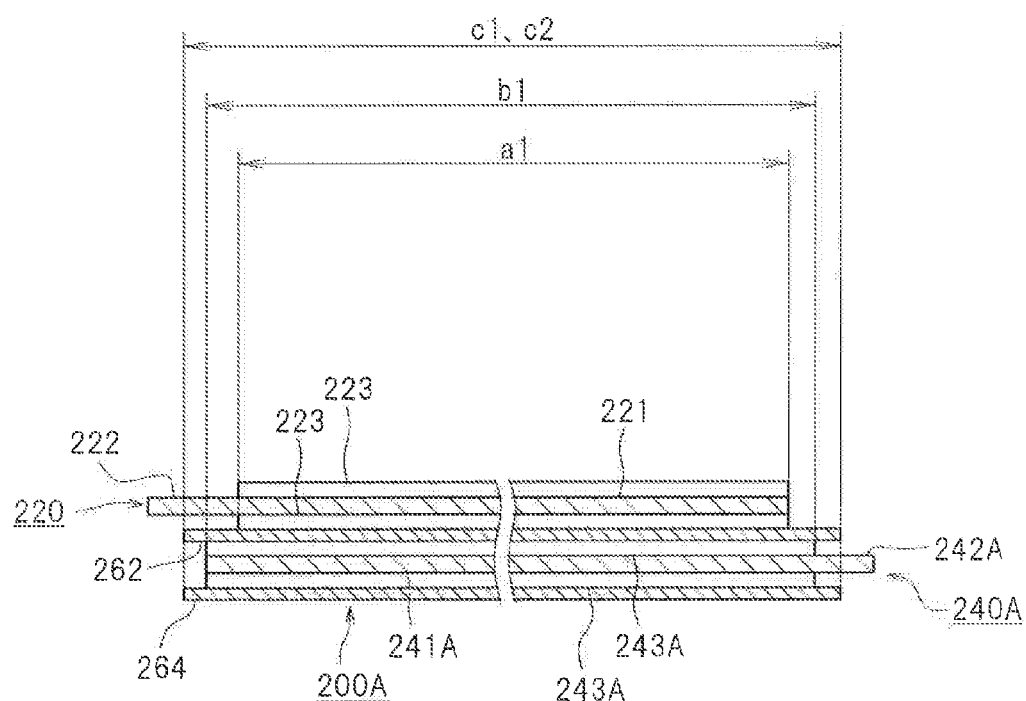
FIG. 10 is a cross-sectional view illustrating the stacking structure of a positive electrode sheet and a negative electrode sheet of the wound electrode assembly in the lithium-ion secondary battery according to one embodiment of the present invention.
Figure 11:
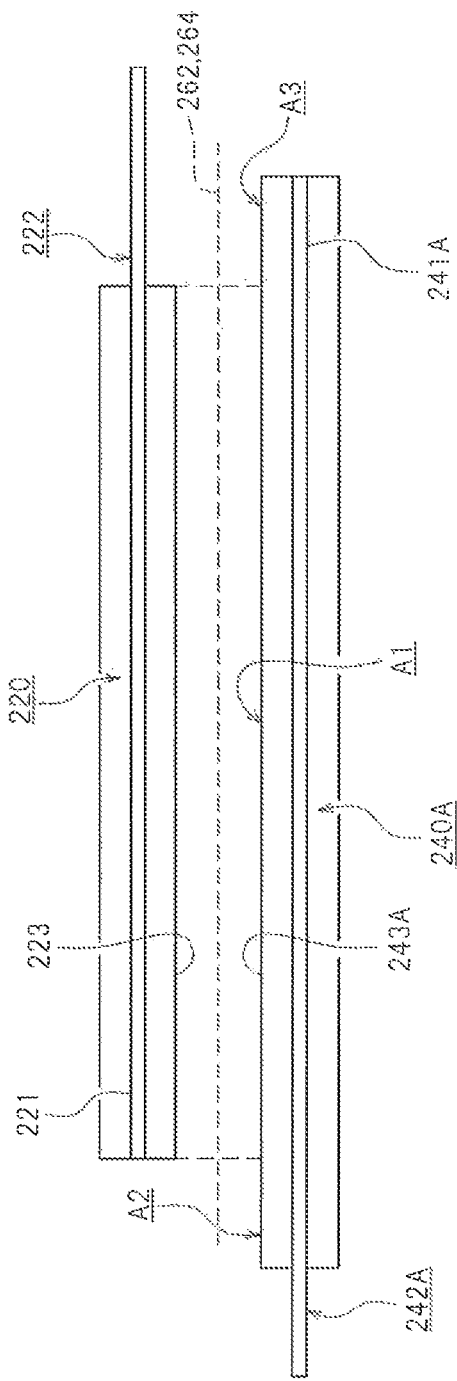
FIG. 11 is a cross-sectional view schematically illustrating the structure of the lithium-ion secondary battery according to one embodiment of the present invention.

FIG. 9 illustrates a lithium-ion secondary battery 100A, as the non-aqueous electrolyte secondary battery proposed herein. FIG. 10 is a cross-sectional view illustrating the stacking structure of the positive electrode sheet 220 and the negative electrode sheet 240A of the wound electrode assembly 200A. FIG. 11 is a cross-sectional view schematically illustrating the structure of the lithium-ion secondary battery 100A.

As illustrated in FIGS. 9 and 10, the lithium-ion secondary battery 100A has a negative electrode current collector 241A, and a negative electrode active material layer 243A retained on the negative electrode current collector 241A and disposed so as to cover the positive electrode active material layer 223. The separators 262 and 264 are interposed between the positive electrode active material layer 223 and the negative electrode active material layer 243A.

<<Negative Electrode Active Material Layer 243A>>

The negative electrode active material layer 243A of the lithium-ion secondary battery 100A contains natural graphite and artificial graphite as the negative electrode active material particles. As illustrated in FIGS. 10 and 11, the negative electrode active material layer 243A has a region A1 facing the positive electrode active material layer 223, and regions A2 and A3 not facing the positive electrode active material layer 223. The region A1 of the negative electrode active material layer 243A facing the positive electrode active material layer 223 contains the natural graphite in a larger proportion than the regions A2 and A3 not facing the positive electrode active material layer 223. The regions A2 and A3 not facing the positive electrode active material layer 223 contains the artificial graphite in a larger proportion than the region A1 facing the positive electrode active material layer 223.

The present inventors discovered that when the proportion of the natural graphite is made larger in the region A1 of the negative electrode active material layer 243A facing the positive electrode active material layer 223 than in the regions A2 and A3 not facing the positive electrode active material layer 223 and moreover the proportion of the artificial graphite is made larger in the regions A2 and A3 not facing the positive electrode active material layer 223 than in the region A1 facing the positive electrode active material layer 223, the reaction resistance (battery resistance) can be kept low and at the same time the capacity retention ratio can be kept high.

<<Natural Graphite and Artificial Graphite>>

Natural graphite is a graphite material obtained by graphitization over many years of time in the natural world. In contrast, artificial graphite is a graphite material obtained by graphitization through industrial production. These graphite materials have a layered structure in which carbon hexagonal network planes are stacked to form a plurality of layers. In this case, during charge, lithium ions enter the space between the layers in the graphite material from the edge portions of the graphite material (the edge portions of the layers) and spread across the space between the layers.

<<Amorphous Carbon Film>>

In this embodiment, flake graphite particles (also referred to as flake graphite), for example, may be used as the natural graphite. In addition, the natural graphite may be at least partially covered with an amorphous carbon film. Here, the amorphous carbon film is a film made of an amorphous carbon material. For example, the natural graphite that is at least partially covered with the amorphous carbon film can be obtained by mixing pitch with natural graphite that serves as the core and baking the mixture.

Here, it is desirable that the weight ratio X of the amorphous carbon film in the natural graphite covered with the amorphous carbon film be approximately $0.01 \leq X \leq 0.10$. It is more preferable that the weight ratio X of the amorphous carbon film be $0.02 \leq X$. It is more preferable that the upper limit thereof be: $X \leq 0.08$, still more preferably $X \leq 0.06$. This makes it possible to obtain natural graphite that is appropriately covered by the amorphous carbon film. By using, as the negative electrode active material particles, the natural graphite that is appropriately covered by the amorphous carbon film, side reactions between the electrolyte solution and the natural graphite can be prevented, and performance degradation of the lithium-ion secondary battery 100A can be prevented.

<<R Value>>

It is preferable that the natural graphite have an R value of from 0.2 to 0.6, as determined by Raman spectroscopy, and that the artificial graphite have an R value of less than or equal to 0.2, as determined by Raman spectroscopy. The natural graphite on which the amorphous carbon film is formed as described above (i.e., amorphous-coated natural graphite) should be evaluated using the R value determined for the natural graphite in the state in which the amorphous carbon film has been formed. Herein, the term "R value" refers to the intensity ratio ($R=I_{1360}/I_{1580}$) called R value, which is the ratio of two Raman spectrum bands, the G band (1580 cm$^{-1}$) originating from graphite structure and the D band (1360 cm$^{-1}$) originating from structural disorder. Here, it is possible to use a Nicolet scattering type laser Raman spectrometer made by Thermo Fisher Scientific Inc., for example, as the device for obtaining Raman spectrum bands.

The higher the R value is, the more disordered the graphite structure is. Conversely, the lower the R value is, the more highly ordered the graphite structure is. It is desirable to select artificial graphite with a more highly ordered graphite structure than natural graphite, by setting the R value of the natural graphite to be from 0.2 to 0.6 and the R value of the artificial graphite to be less than or equal to 0.2. In this case, it is more preferable that the R value of the natural graphite be set at equal to or higher than 0.22. Also, the R value of the artificial graphite may be less than 0.18. This makes the difference in R value between the natural graphite and the artificial graphite clearer. Such R values may be determined by extracting at least 100 particles and obtaining the mean value of the R values.

<<Method of Forming Negative Electrode Active Material Layer 243A>>

In this embodiment, the method of forming the negative electrode active material layer 243A includes the following steps A through D, for example.

In step A, a first mixture is prepared. The first mixture is a mixture that is to be coated onto a region of the negative electrode current collector 241A that corresponds to the region A1 facing the positive electrode active material layer 223.

In step B, a second mixture is prepared. The second mixture is a mixture that is to be coated onto regions of the negative electrode current collector 241A that correspond to the regions A2 and A3 not facing the positive electrode active material layer 223.

In step C, the first mixture prepared in the step A is coated onto a region of the negative electrode current collector 241A that corresponds to the region A1 facing the positive electrode active material layer 223.

In step D, the second mixture prepared in the step B is coated onto regions of the negative electrode current collector 241A that correspond to the regions A2 and A3 not facing the positive electrode active material layer 223.

<<First Mixture>>

For the first mixture that is prepared in the step A, it is desirable to prepare a paste comprising a mixture of natural graphite and a binder, for example. Thus, a paste that does not contain artificial graphite but contains natural graphite as the negative electrode active material particles can be obtained. It is also possible to prepare a paste in which natural graphite and artificial graphite are mixed at an appropriate ratio. For example, it is possible to prepare a paste in which the weight ratio of natural graphite and artificial graphite is set at natural graphite:artificial graphite=9:1.

<<Second Mixture>>

For the second mixture that is prepared in the step A, it is desirable to prepare a paste comprising a mixture of artificial graphite and a binder, for example. Thus, a paste that does not contain natural graphite but contains artificial graphite as the negative electrode active material particles can be obtained. It is also possible to prepare a paste in which natural graphite and artificial graphite are mixed at an appropriate ratio. For example, it is possible to prepare a paste in which the weight ratio of natural graphite and artificial graphite is set at natural graphite:artificial graphite=1:9.

<<Steps C and D>>

Regarding steps C and D, the following describes one example of the process of forming the negative electrode active material layer 243A.

Figure 12:
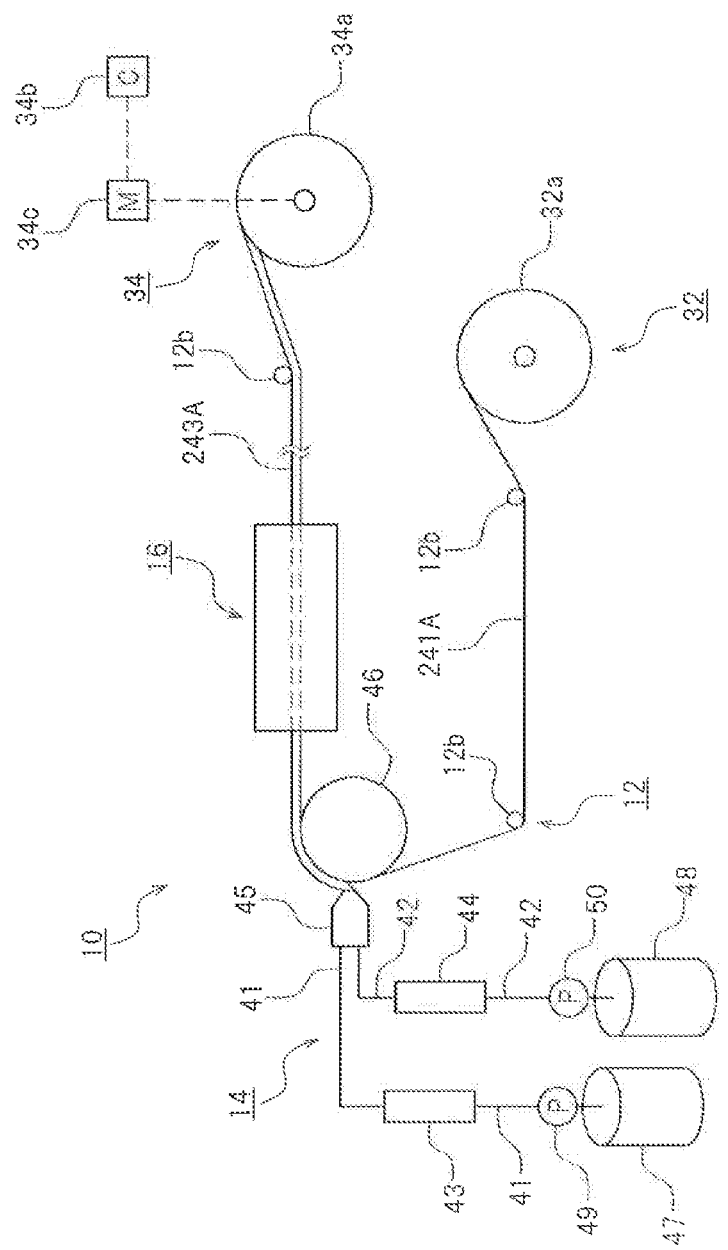
FIG. 12 is a view illustrating the process of forming a negative electrode active material layer.

FIG. 12 is a view illustrating the process in which the negative electrode active material layer 243A is formed. As illustrated in FIG. 12, the negative electrode active material layer 243 is formed by coating the first mixture prepared in the step A and the second mixture prepared in the step B onto predetermined regions of the negative electrode current collector 241A, followed by drying and thereafter pressing the article. As illustrated in FIG. 12, the manufacturing apparatus for forming the negative electrode active material layer 243A has a traveling path 12 in which the negative electrode current collector 241A is allowed to travel, a coating device 14 for coating the mixture paste that becomes the negative electrode active material layer 243A onto the negative electrode current collector 241, and a drying oven 16 for drying the mixture coated on the negative electrode current collector 241A.

<<Traveling Path 12>>

The traveling path 12 is a path in which the negative electrode current collector 241A is allowed to travel. In this embodiment, a plurality of guides 12b are disposed in the traveling path 12 along a predetermined path for conveying the negative electrode current collector 241A. A supplying unit 32 for supplying the negative electrode current collector 241A is provided at the starting end of the traveling path 12. In the supplying unit 32, the negative electrode current collector 241A is disposed, which has been wound around a winding core 32a in advance. From the supplying unit 32, an appropriate amount of the negative electrode current collector 241A is supplied as appropriate to the traveling path 12. A collecting unit 34 for collecting the negative electrode current collector 241A is provided at the trailing end of the traveling path 12. The collecting unit 34 winds the negative electrode current collector 241A, which has been subjected to a predetermined treatment in the traveling path 12, around a winding core 34a.

In this embodiment, the collecting unit 34 is provided with, for example, a control unit 34b and a motor 34c. A program for controlling rotation of the winding core 34a of the collecting unit 34 is set in advance in the control unit 34b. The motor 34c is an actuator for driving and rotating the winding core 34a, and is driven by the program set in the control unit 34b. The electrode material coating device 14 and the drying oven 16 are disposed in that order in the traveling path 12.

<<Electrode Material Coating Device 14 (Coating Process)>>

In this embodiment, the compositions of the negative electrode active material particles contained in the negative electrode active material layer 243 are varied between the region A1 facing the positive electrode active material layer 223 and the regions A2 and A3 not facing the positive electrode active material layer 223 in the wound electrode assembly 200 (see FIGS. 10 and 11) which is prepared thereafter. For this reason, the electrode material coating device 14 applies respective mixtures having different compositions of the negative electrode active material particles onto the region A1 facing the positive electrode active material layer 223 and the regions A2 and A3 not facing the positive electrode active material layer 223.

In this case, the phrase "the compositions of the negative electrode active material particles are varied" means that the compositions (i.e., the type of the materials and the proportions thereof) of the negative electrode active material particles are substantially different. For example, "varying the compositions of the negative electrode active material particles" may include using different negative electrode active material particles for the region A1 facing the positive electrode active material layer 223 and for the regions A2 and A3 not facing the positive electrode active material layer 223. In addition, "varying the compositions of the negative electrode active material particles" may also include the cases in which two or more kinds of different negative electrode active material particles are contained in the region A1 facing the positive electrode active material layer 223 and the regions A2 and A3 not facing the positive electrode active material layer 223, and the proportions thereof are different. It should be noted that such a case that a plurality of kinds of negative electrode active material particles are used and the proportions of the negative electrode active material particles contained are slightly different because of an error in manufacture is regarded as the negative electrode active material particles having substantially the same composition herein. In addition, such a case that the proportions of the plurality of negative electrode active material particles are slightly different in very small local regions of the negative electrode active material layer 243A is also regarded as the negative electrode active material particles having substantially the same composition herein.

As illustrated in FIG. 12, the electrode material coating device 14 has flow passages 41 and 42, filters 43 and 44, and a coating unit 45. In this embodiment, the electrode material coating device 14 is configured to apply a mixture to the negative electrode current collector 241 that travels on a back-roll 46 arranged in the traveling path 12. In this embodiment, the electrode material coating device 14 further has tanks 47 and 48 and pumps 49 and 50. The tanks 47 and 48 are containers that respectively store different mixtures. The pumps 49 and 50 are devices that send out the mixtures from the tanks 47 and 48 to the flow passages 41 and 42.

<<Flow Passages 41 and 42>>

The flow passages 41 and 42 are flow passages through which slurries containing negative electrode active material particles dispersed in a solvent can flow. In this embodiment, the flow passages 41 and 42 are arranged from the tanks 47 and 48 to the coating unit 45. The filters 43 and 44 are disposed in the flow passages 41 and 42. In this embodiment, the first mixture, which is to be coated onto the region A1 facing the positive electrode active material layer 223, and the second mixture, which is to be coated onto the regions A2 and A3 not facing the positive electrode active material layer 223, are respectively prepared in the tanks 47 and 48. The first mixture and the second mixture have different types of negative electrode active material particles contained in the solvent, as described above. In addition, it is preferable that the first mixture and the second mixture not easily mix with each other. For example, it is possible to make the first mixture and the second mixture not easily mix with each other by adjusting the concentration of the solid content of the first mixture and the concentration of the solid content of the second mixture appropriately.

<<Coating Unit 45>>

Figure 13:
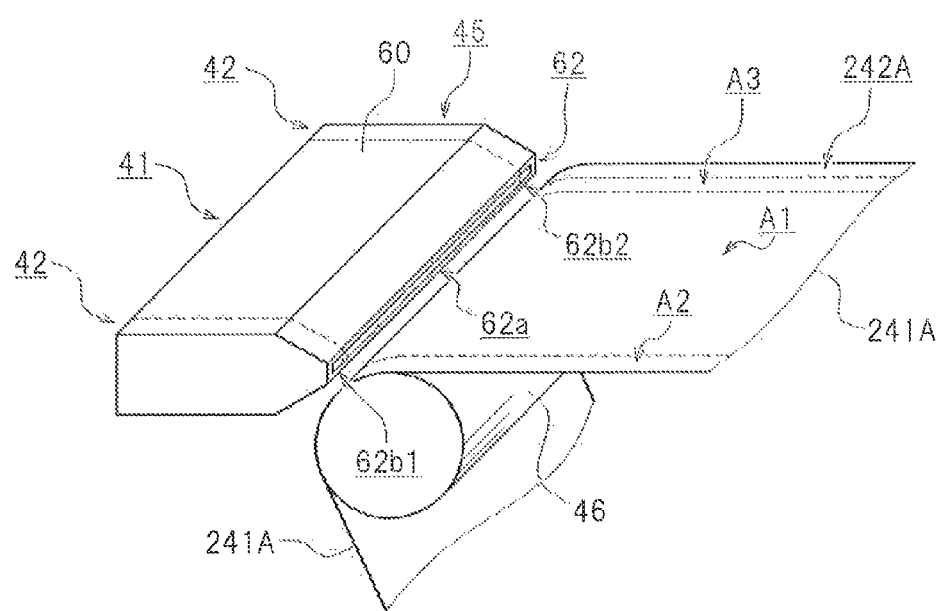
FIG. 13 is a view illustrating one example of a die used for forming a negative electrode active material layer.

The coating unit 45 applies the first mixture onto the region A1 (see FIG. 11) in the negative electrode current collector 241A facing the positive electrode active material layer 223. The coating unit 45 also applies the second mixture onto the regions A2 and A3 in the negative electrode current collector 241A not facing the positive electrode active material layer 223. FIG. 13 is a view illustrating one example of a die used for forming the negative electrode active material layer 243A. In this embodiment, for example, a die 60 having a wide discharge port 62 is used in the coating unit 45, as illustrated in FIG. 13. The discharge port 62 of the die 60 is divided into an intermediate portion 62a and opposite side portions 62b1 and 62b2.

Flow passages respectively connected to the intermediate portion 62a and the opposite side portions 62b1 and 62b2 are formed inside the die 60. The intermediate portion 62a of the discharge port 62 is in communication with the flow passage 41 to which the first mixture is supplied. The opposite side portions 62b1 and 62b2 of the discharge port 62 are in communication with the flow passages 42 to which the second mixture is supplied. The intermediate portion 62a of the discharge port 62 discharges the first mixture. The opposite side portions 62b1 and 62b2 of the discharge port 62 discharge the second mixture.

Herein, the intermediate portion 62a of the discharge port 62 of the die 60 is aimed at the region A1 in the negative electrode current collector 241A facing the positive electrode active material layer 223. In addition, the opposite side portions 62b1 and 62b2 of the discharge port 62 of the die 60 are aimed at the regions A2 and A3 in the negative electrode current collector 241A not facing the positive electrode active material layer 223. In this case, the first mixture is coated onto the region A1 in the negative electrode current collector 241A facing the positive electrode active material layer 223. The second mixture is coated onto the regions A2 and A3 in the negative electrode current collector 241A not facing the positive electrode active material layer 223. The negative electrode current collector 241A coated with the first mixture and the second mixture in this way is supplied to the drying oven 16 (see FIG. 12). Thus, the negative electrode active material layer 243A having different compositions of the negative electrode active material particles between the region A1 facing the positive electrode active material layer 223 and the regions A2 and A3 not facing the positive electrode active material layer 223 is formed.

For example, a mixture using natural graphite (or containing a larger proportion of natural graphite than that of artificial graphite) as the negative electrode active material particles is prepared for the first mixture. Also, a mixture using artificial graphite (or containing a larger proportion of artificial graphite than that of natural graphite) as the negative electrode active material particles is prepared for the second mixture. This makes it possible to form the negative electrode active material layer 243A in which the proportion of natural graphite is larger in the region A1 in the negative electrode current collector 241A facing the positive electrode active material layer 223 and the proportion of artificial graphite is larger in the regions A2 and A3 in the negative electrode current collector 241A not facing the positive electrode active material layer 223.

In addition, the compositions of the negative electrode active material particles contained in the negative electrode active material layer 243A can be varied between the region A1 facing the positive electrode active material layer 223 and the regions A2 and A3 not facing the positive electrode active material layer 223 by appropriately adjusting the first mixture and the second mixture.

The present inventors prepared lithium-ion secondary batteries with appropriately varying the compositions of the negative electrode active material particles contained in the negative electrode active material 243A between the region A1 facing the positive electrode active material layer 223 and the regions A2 and A3 not facing the positive electrode active material layer 223, and studied the performance of each of the batteries. As a result, it was discovered that the reaction resistance (battery resistance) can be kept low and at the same time the capacity retention ratio can be kept high by making the proportion of the natural graphite larger in the region A1 of the negative electrode active material layer 243A facing the positive electrode active material layer 223, and making the proportion of the artificial graphite larger in the regions A2 and A3 not facing the positive electrode active material layer 223.

<<Test Cell>>

Herein, test cells were prepared by appropriately varying the compositions of the negative electrode active material particles contained in the negative electrode active material 243A between the region A1 facing the positive electrode active material layer 223 and the regions A2 and A3 not facing the positive electrode active material layer 223, as described above. The reaction resistance and the capacity retention ratio (herein, the capacity retention ratio after the cell was stored in a predetermined high-temperature environment) were evaluated for each of the test cells. Each of the test cells was configured into a cylindrical, so-called 18650 cell (not shown). Samples 1 to 5 having different structures of the negative electrode active material layer were prepared for the test cells.

<<Positive Electrode of the Test Cell>>

A positive electrode mixture was prepared to form the positive electrode active material layer in the positive electrode. A three-component lithium-transition metal oxide ($LiNi_{1/3}Co_{1/3}Mn_{1/3}O_2$) as the positive electrode active material, acetylene black (AB) as the conductive agent, and polyvinylidene fluoride (PVDF) as the binder were used for the positive electrode mixture. The mass ratio of the positive electrode active material, the conductive agent, and the binder was set so that the positive electrode active material:the conductive agent:the binder=91:6:3. These materials, the positive electrode active material, the conductive agent, and the binder, were mixed with ion exchange water to thereby prepare the positive electrode mixture. Subsequently, the positive electrode mixture was coated onto both sides of the positive electrode current collector, and dried. Herein, an aluminum foil (thickness 15 μm) was used as the positive electrode current collector. Thus, a positive electrode (positive electrode sheet) having a positive electrode active material layer on both sides of the positive electrode current collector was prepared. After having been dried, the positive electrode sheet was pressure-rolled by a roller press so that the thickness thereof became 110 μm. The amount of the positive electrode mixture coated on the positive electrode current collector was set so that the amount of the positive electrode active material layer would be 25 mg/cm² per unit area of the positive electrode current collector after the positive electrode mixture was dried.

<<Negative Electrode of the Test Cell>>

First, the negative electrode mixture was prepared using negative electrode active material particles, carboxymethylcellulose (CMC) as a thickening agent, and a binder. In sample A, styrene-butadiene rubber (SBR), which is a rubber-based binder, was used for the binder.

Here, the mass ratio of the negative electrode active material particles, the thickening agent (CMC), and the binder (SBR) was set so that the negative electrode active material particles:the thickening agent:the binder=98:1:1. These materials, the negative electrode active material particles, the CMC, and the SBR, were mixed with ion exchange water to thereby prepare the negative electrode mixture. Subsequently, the negative electrode mixture was coated onto both sides of the negative electrode current collector, and dried. Herein, a copper foil (thickness 10 μm) was used as the negative electrode current collector. Thus, a negative electrode (negative electrode sheet) having a negative electrode active material layer on both sides of the negative electrode current collector was prepared. After having been dried, the negative electrode sheet was pressure-rolled by a roller press so that the thickness thereof became 100 μm. Thereby, the thickness of each negative electrode active material layer formed on both sides of the negative electrode current collector was adjusted to 45 μm. The amount of the negative electrode mixture coated on the negative electrode current collector was set so that the amount of the negative electrode active material layer would be 13 mg/cm$^2$ per unit area of the negative electrode current collector after the negative electrode mixture was dried.

<<Separator of the Test Cell>>

A separator made of a microporous sheet having a three-layer structure (PP/PE/PP) of polypropylene (PP) and polyethylene (PE) was used as the separator. Here, the mass ratio of polypropylene (PP) and polyethylene (PE) was set so that PP:PE:PP=3:4:3.

<<Assembling of the Test Cell>>

Using the negative electrode, the positive electrode, and the separator prepared in the above-described manner, a 18650 type test cell (lithium-ion battery) was constructed. Herein, a cylindrically-shaped wound electrode assembly, in which the positive electrode sheet and the negative electrode sheet were laminated and wound with the separators interposed therebetween, was prepared. Then, the wound electrode assembly was enclosed in a cylindrically-shaped battery case, then a non-aqueous electrolyte solution was filled therein, and the battery case was sealed, to construct a test cell. Here, the non-aqueous electrolyte solution was prepared by dissolving 1 mol/L of LiPF$_6$ as a lithium salt in a mixed solvent of ethylene carbonate (EC), dimethyl carbonate (DMC), and ethyl methyl carbonate (EMC) in a predetermined volume ratio (EC:DMC:EMC=3:4:3).

Here, test cells were prepared in which the compositions of the negative electrode active material particles were different between the region A1 of the negative electrode active material layer facing the positive electrode active material layer 223 and the regions A2 and A3 thereof not facing the positive electrode active material layer 223. Then, the reaction resistance at −30° C. and the post-storage capacity retention ratio (the capacity retention ratio after the cell was stored in a predetermined high-temperature environment for a predetermined time) were evaluated for each of the test cells.

<<Conditioning>>

The conditioning is carried out according to the following procedures 1 and 2.

Procedure 1: The test cell is charged with a constant current at 1C to 4.1 V and thereafter rested for 5 minutes.

Procedure 2: After procedure 1, the test cell is charged with a constant voltage for 1.5 hours and then rested for 5 minutes.

In such conditioning, the required reaction is caused by the initial charging, and a gas is produced. In addition, a required film is formed on the negative electrode active material layer, for example.

<<Measurement of Rated Capacity>>

After the just-described conditioning, the rated capacity is measured for the test cell. The measurement of rated capacity is carried out according to the following procedures 1 through 3. Herein, in order to make the influence of temperature uniform, the rated capacity is measured in a temperature environment at a temperature of 25° C.

Procedure 1: The test cell is discharged with a constant current at 1C to 3.0 V, then discharged with a constant voltage for 2 hours, and thereafter rested for 10 seconds.

Procedure 2: The test cell is charged with a constant current at 1C to 4.1 V, then charged with a constant voltage for 2.5 hours, and thereafter rested for 10 seconds.

Procedure 3: The test cell is discharged with a constant current at 0.5C to 3.0 V, then discharged with a constant voltage for 2 hours, and thereafter rested for 10 seconds.

Here, the discharge capacity (CCCV discharge capacity) obtained in the discharge process starting from the constant-current discharging and finishing with the constant-voltage discharging in Procedure 3 is defined as the "rated capacity".

<<SOC Adjustment>>

The SOC adjustment is carried out according to the following procedures 1 and 2. It is desirable to perform the SOC adjustment after the above-described conditioning process and the measurement of rated capacity. Herein, in order to make the influence of temperature uniform, the SOC adjustment is carried out in a temperature environment at a temperature of 25° C.

Procedure 1: The test cell is charged from 3 V with a constant current at 1C so as to be in a state of charge of about 60% of the rated capacity (60% SOC).

Procedure 2: After procedure 1, the test cell is charged with a constant voltage for 2.5 hours.

This enables the test cell to be adjusted to a predetermined state of charge. Although it is described here that the SOC is adjusted to 60%, it is possible to adjust the SOC to an arbitrary charged state by changing the state of charge in the foregoing procedure 1. For example, when the SOC needs to be adjusted to 90%, the test cell should be brought into a state of charge of 90% of the rated capacity (90% SOC) in the foregoing procedure 1.

<<Initial Capacity Measurement>>

The measurement of initial capacity was carried out as follows. For example, under a temperature condition of 25° C., the test cell was charged with a constant current of 1C until the terminal voltage became 4.1 V, and subsequently charged with the constant voltage until the total charge time reached 2.5 hours (CC-CV charging). After the test cell was rested for 10 minutes from the completion of the charging, the test cell was discharged at 25° C. from 4.1 V to 3.0 V with a constant current of 0.33C (⅓C) and subsequently discharged with the constant voltage until the total discharge time reached 4 hours. The discharge capacity at that time was determined as the initial capacity Q1 [Ah] for each of the batteries. Herein, the initial capacity was measured after each of the test cells was adjusted to 90% SOC.

<<Reaction Resistance at −30° C.>>

Figure 14:
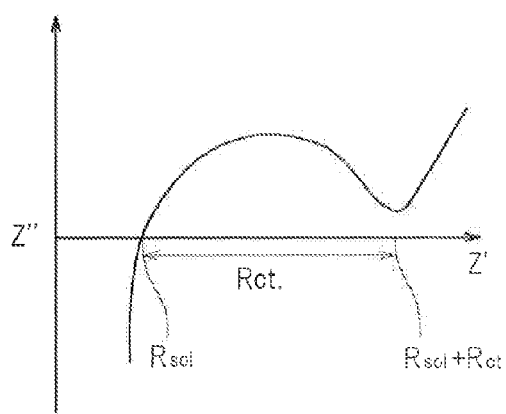
FIG. 14 is a view illustrating a typical example of Cole-Cole plot (Nyquist plot) in the alternating current impedance measurement method.

The reaction resistance is the reaction resistance measured by an alternating current impedance measurement method. It is obtained by an alternating current impedance measurement method. FIG. 14 is a view illustrating a typical example of Cole-Cole plot (Nyquist plot) in the alternating current impedance measurement method. As illustrated in FIG. 14, direct current resistance ($R_{sol}$) and reaction resistance ($R_{ct}$) can be calculated based on the Cole-Cole plot obtained by the equivalent circuit fitting in the alternating current impedance measurement. Here, the reaction resistance ($R_{ct}$) can be obtained by the following equation.

$$R_{ct}=(R_{sol}+R_{ct})-R_{sol}$$

These measurements and the calculation of direct current resistance ($R_{sol}$) and reaction resistance ($R_{ct}$) can be carried out using a commercially available apparatus that is programmed in advance. An example of such an apparatus is an electrochemical impedance analyzer made by Solartron Corp. Herein, using the test cell that was adjusted to 40% SOC (a state of charge of about 40% of the rated capacity), a complex impedance measurement was carried out within a frequency range of $10^{-3}$ Hz to $10^4$ Hz in a temperature environment at −30° C. Then, as illustrated in FIG. 11, the reaction resistance (Rct) obtained by equivalent circuit fitting using Nyquist plot was defined as the "reaction resistance at −30° C.".

<<Post-Storage Capacity Retention Ratio>>

The capacity retention ratio (post-storage capacity retention ratio) can be obtained as follows. A test cell adjusted to a predetermined state of charge is stored in a predetermined environment for a predetermined time, and thereafter the discharge capacity thereof (hereinafter referred to as "post-storage capacity" as appropriate) is determined under the same conditions as used for the initial capacity. Then, the capacity retention ratio (post-storage capacity retention ratio) is obtained as the ratio (post-storage capacity)/(initial capacity). Herein, the "post-storage capacity" is the discharge capacity that is measured based on a test cell that is adjusted to 90% SOC and thereafter stored in a temperature environment at 60° C. for 30 days.

Post-storage capacity retention ratio=(Post-storage capacity)/(Initial capacity)×100(%)

Figure 15:
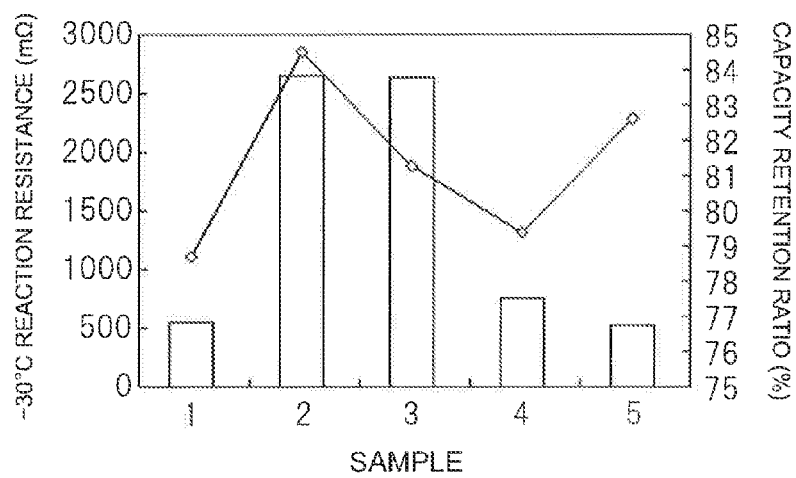
FIG. 15 shows reaction resistance (mΩ) at −30° C. and post-storage capacity retention ratio (%) for samples 1 to 5.

The present inventors prepared natural graphite and artificial graphite for the negative electrode active material particles, as shown in Table 1. The natural graphite used herein was natural graphite coated with an amorphous carbon film. Then, samples were prepared in each of which the compositions of the negative electrode active material particles were different between the region A1 facing the positive electrode active material layer 223 and the regions A2 and A3 not facing the positive electrode active material layer 223. Table 1 and FIG. 15 show the reaction resistance (mΩ) at −30° C. and the post-storage capacity retention ratio (%) for the following samples 1 to 5. In FIG. 15, the reaction resistance (mΩ) at −30° C. is represented by the bar graphs, and the post-storage capacity retention ratio (%) is represented by the diamond-shaped plots "◇".

TABLE 1

| | Region facing positive electrode active material layer | Region not facing positive electrode active material layer | Reaction resistance (mΩ) | Capacity retention ratio (%) |
|---|---|---|---|---|
| Sample 1 | Natural graphite | Natural graphite | 531 | 78.7 |
| Sample 2 | Artificial graphite | Artificial graphite | 2653 | 84.5 |
| Sample 3 | Artificial graphite | Natural graphite | 2634 | 81.3 |
| Sample 4 | Natural graphite + Artificial graphite | | 743 | 79.4 |
| Sample 5 | Natural graphite | Artificial graphite | 527 | 82.6 |

<<Sample 1>>

In sample 1, natural graphite was used as the negative electrode active material particles for the region A1 of the negative electrode active material layer 243A (see FIG. 11) facing the positive electrode active material layer 223, and natural graphite was also used as the negative electrode active material particles for the regions A2 and A3 not facing the positive electrode active material layer 223. In this case, the reaction resistance was 531 mΩ, and the post-storage capacity retention ratio was 78.7%. Although sample 1 could keep the reaction resistance (mΩ) at −30° C. to be low, it tended to show a low post-storage capacity retention ratio (%).

<<Sample 2>>

In sample 2, artificial graphite was used as the negative electrode active material particles for the region A1 of the negative electrode active material layer 243A (see FIG. 11) facing the positive electrode active material layer 223, and artificial graphite was also used as the negative electrode active material particles for the regions A2 and A3 not facing the positive electrode active material layer 223. In this case, the reaction resistance was 2653 mΩ, and the post-storage capacity retention ratio was 84.5%. Although sample 2 could keep the post-storage capacity retention ratio (%) to be high, it tended to show a high reaction resistance (mΩ) at −30° C.

<<Sample 3>>

In sample 3, artificial graphite was used as the negative electrode active material particles for the region A1 of the negative electrode active material layer 243A (see FIG. 11) facing the positive electrode active material layer 223, and natural graphite was used as the negative electrode active material particles for the regions A2 and A3 not facing the positive electrode active material layer 223. In this case, the reaction resistance was 2634 mΩ, and the post-storage capacity retention ratio was 81.3%. Sample 3 can keep the high post-storage capacity retention ratio (%) to be high, although not as high as sample 2 can. However, the reaction resistance (mΩ) at −30° C. tended to be high, almost as high as that of sample 2.

<<Sample 4>>

In sample 4, a mixture of natural graphite and artificial graphite in a predetermined ratio was used as the negative electrode active material particles for both the region A1 of the negative electrode active material layer 243A (see FIG. 11) facing the positive electrode active material layer 223 and the regions A2 and A3 thereof not facing the positive electrode active material layer 223. Herein, the ratio of natural graphite and artificial graphite was: natural graphite: artificial graphite=93:7 in mass ratio. In this case, the reaction resistance was 743 mΩ, and the post-storage capacity retention ratio was 79.4%. Although sample 4 could keep the reaction resistance (mΩ) at −30° C. to be low, it tended to show a low post-storage capacity retention ratio (%).

<<Sample 5>>

In sample 5, natural graphite was used as the negative electrode active material particles for the region A1 of the negative electrode active material layer 243A (see FIG. 11) facing the positive electrode active material layer 223, and artificial graphite was used as the negative electrode active material particles for the regions A2 and A3 not facing the positive electrode active material layer 223. In this case, the reaction resistance was 527 mΩ, and the post-storage capacity retention ratio was 82.6%. Sample 5 could keep the reaction resistance (mΩ) at −30° C. to be low, and moreover, it tended to be able to keep the post-storage capacity retention ratio (%) to be high.

As described above, when natural graphite is used as the negative electrode active material particles for the region A1 of the negative electrode active material layer 243A (see FIG. 11) facing the positive electrode active material layer 223, and artificial graphite is used as the negative electrode active material particles for the regions A2 and A3 not facing the positive electrode active material layer 223, the reaction resistance (mΩ) at −30° C. can be kept low, and moreover, the post-storage capacity retention ratio (%) can be kept high. Therefore, with such a configuration, it is possible to achieve such battery performance that the reaction resistance in a low-temperature environment can be kept low and also the capacity retention ratio after storage in a high-temperature environment can be kept high.

<<Analysis by the Inventors>>

As a factor in the foregoing, the present inventors have been paying special attention to the point that artificial graphite has more highly ordered carbon layers than natural graphite, which enables more smooth absorption and release of lithium ions, especially to the point that it can suppress the amount of SEI formation. The SEI (solid electrolyte interface) means a surface film that inactivates and stabilizes the surface of graphite so that lithium can be inserted therein. The SEI can be formed by a reductive decomposition reaction of the electrolyte solution. The SEI is essential for graphite to cause lithium-ion insertion and extraction. However, the SEI is produced by the reductive decomposition reaction of the electrolyte solution, which involves consumption of electric charge. This can be a cause of irreversible capacity.

In particular, the regions A2 and A3 of the negative electrode active material layer 243A (see FIG. 11) not facing the positive electrode active material layer 223 do not contribute much to the reactions in high-rate charge and discharge. Therefore, if lithium ions are irreversibly trapped in these regions, this can cause an increase in the reaction resistance of the lithium-ion secondary battery and a decrease in the capacity retention ratio. The present inventors believe that using artificial graphite for the regions A2 and A3 not facing the positive electrode active material layer 223 can inhibit the excessive SEI formation and also prevent the irreversible trapping of lithium ions in the regions A2 and A3 not facing the positive electrode active material layer 223. On the other hand, if artificial graphite is used for the region A1 facing the positive electrode active material layer 223, lithium ions can be extracted more easily from the region A1 facing the positive electrode active material layer 223. This is believed to be a factor in decreasing the capacity retention ratio during long-term storage.

Thus, when the negative electrode active material layer 243A (see FIG. 11) is such that the proportion of natural graphite is larger in the region A1 facing the positive electrode active material layer 223 and the proportion of artificial graphite is large in the regions A2 and A3 not facing the positive electrode active material layer 223, it is possible to keep the reaction resistance in a low-temperature environment to be low and also keep the capacity retention ratio after storage in a high-temperature environment to be high.

In the foregoing sample 5, natural graphite was used as the negative electrode active material particles for the region A1 of the negative electrode active material layer 243A (see FIG. 11) facing the positive electrode active material layer 223, and artificial graphite was used as the negative electrode active material particles for the regions A2 and A3 thereof not facing the positive electrode active material layer 223. Here, natural graphite was used as the negative electrode active material particles for the region A1 facing the positive electrode active material layer 223, and artificial graphite was used as the negative electrode active material particles for the regions A2 and A3 not facing the positive electrode active material layer 223. However, it is also possible to use a mixture of natural graphite and artificial graphite as the negative electrode active material particles for each of the regions. In this case, it is desirable that the proportion of natural graphite should be made larger in the region A1 facing the positive electrode active material layer 223, and the proportion of artificial graphite should be made larger in the regions A2 and A3 not facing the positive electrode active material layer 223. The negative electrode active material particles are not limited to this, but materials other than natural graphite and artificial graphite may be mixed in the negative electrode active material particles as long as the above-described battery performance can be obtained.

That is, when the negative electrode active material layer 243A (see FIG. 11) is such that the proportion of natural graphite is made larger in the region A1 facing the positive electrode active material layer 223 than in the regions A2 and A3 not facing the positive electrode active material layer 223 and moreover the proportion of artificial graphite is made larger in the regions A2 and A3 not facing the positive electrode active material layer 223 than in the region A1 facing the positive electrode active material layer 223, the battery resistance in a low-temperature environment tends to be kept low and the capacity retention ratio after storage in a high-temperature environment tends to be kept high.

In this case, it is desirable that the region A1 of the negative electrode active material layer 243A facing the positive electrode active material layer 223 contain the natural graphite in a weight proportion of, for example, equal to or greater than 90% of the total weight of the natural graphite and the artificial graphite. This makes it possible to obtain the effect of allowing the region A1 of the negative electrode active material layer 243A facing the positive electrode active material layer 223 to have a larger proportion of natural graphite appropriately.

In this case, it is sufficient that the effect of allowing the region A1 of the negative electrode active material layer 243A facing the positive electrode active material layer 223 to have a larger proportion of natural graphite can be obtained appropriately. Therefore, it is desirable that the region A1 of the negative electrode active material layer 243A facing the positive electrode active material layer 223 contain the natural graphite in a weight proportion of, for example, equal to or greater than 95% of the total weight of the natural graphite and the artificial graphite. It is possible that the weight proportion of the natural graphite may be about 90%, or about 85%.

In addition, it is desirable that the regions A2 and A3 of the negative electrode active material layer 243A not facing the positive electrode active material layer 223 contain the artificial graphite in a weight proportion of, for example, equal to or greater than 90% of the total weight of the natural graphite and the artificial graphite. This makes it possible to obtain the effect of allowing the regions A2 and A3 of the negative electrode active material layer 243A not facing the positive electrode active material layer 223 to have a larger proportion of artificial graphite appropriately.

In this case, it is sufficient that the effect of allowing the regions A2 and A3 of the negative electrode active material layer 243A not facing the positive electrode active material layer 223 to have a larger proportion of artificial graphite can be obtained appropriately. Therefore, it is desirable that the regions A2 and A3 of the negative electrode active material layer 243A facing the positive electrode active material layer 223 contain the artificial graphite in a weight proportion of, for example, equal to or greater than 95% of the total weight of the natural graphite and the artificial graphite. It is possible that the weight proportion of the artificial graphite may be about 90%, or about 85%.

<<Relationship with R Value>>

It is preferable that the natural graphite have an R value of from 0.2 to 0.6, as determined by Raman spectroscopy, and that the artificial graphite have an R value of less than or equal to 0.2, as determined by Raman spectroscopy. Herein, as already described above, the term "R value" refers to the intensity ratio ($R=I_{1360}/I_{1580}$) called R value, which is the ratio of two Raman spectrum bands, the G band (1580 $cm^{-1}$) originating from graphite structure and the D band (1360 $cm^{-1}$) originating from structural disorder. The higher the R value is, the more disordered the graphite structure is. Conversely, the lower the R value is, the more highly ordered the graphite structure is. It is desirable to select artificial graphite with a more highly ordered graphite structure than natural graphite, by setting the R value of the natural graphite to be from 0.2 to 0.6 and the R value of the artificial graphite to be less than or equal to 0.2. In this case, it is more preferable that the R value of the natural graphite be set at equal to or higher than 0.22. Also, the R value of the artificial graphite may be less than 0.18. This makes the difference in R value between the natural graphite and the artificial graphite clearer. Such R values may be determined by extracting at least 100 particles and obtaining the mean value of the R values.

Here, it is also possible that the ratio (Ra/Rb) of a mean R value (Ra) and a mean R value (Rb) may be (Ra/Rb)≥1.2, where the mean R value (Ra) is the mean of the R values of the negative electrode active material particles used in the region A1 of the negative electrode active material layer 243A facing the positive electrode active material layer 223, and the mean R value (Rb) is the mean of the R values of the negative electrode active material particles used in the regions A2 and A3 thereof not facing the positive electrode active material layer 223. It is more preferable that (Ra/Rb)≥1.5, still more preferably (Ra/Rb)≥2.0. This produces a clear difference in R value between the negative electrode active material particles used in the region A1 of the negative electrode active material layer 243A facing the positive electrode active material layer 223 and the negative electrode active material particles used in the regions A2 and A3 thereof not facing the positive electrode active material layer 223. This makes it possible to more reliably obtain the tendency that the battery resistance in a low-temperature environment can be kept low and also the capacity retention ratio after storage in a high-temperature environment can be kept high in the lithium-ion secondary battery 100A.

The mean R value (Ra) of the negative electrode active material particles used in the region A1 facing the positive electrode active material layer 223 can be evaluated by extracting at least 100 negative electrode active material particles from the negative electrode active material particles contained in the region A1 of the negative electrode active material layer 243A facing the positive electrode active material layer 223, then obtaining the R value of each particle, and obtaining the arithmetic mean of the obtained R values. Likewise, the mean R value (Rb) of the negative electrode active material particles used in the regions A2 and A3 not facing the positive electrode active material layer 223 can be evaluated by extracting negative electrode active material particles from the regions A2 and A3 of the negative electrode active material layer 243A not facing the positive electrode active material layer 223, then obtaining the R value of each particle, and obtaining the arithmetic mean of the obtained R values.

The extracting of the negative electrode active material particles from the negative electrode active material layer 243A may be carried out by, for example, imparting ultrasonic vibrations to the negative electrode sheet 240A to thereby peel off the negative electrode active material layer 243A from the negative electrode current collector 241A, and heating the negative electrode active material layer 243A to burn off the binder and the thickening agent. Thereby, the negative electrode active material particles contained in the negative electrode active material layer 243A can be extracted.

Hereinabove, the lithium-ion secondary battery according to one embodiment of the present invention has been described. Further variations of the present invention are possible. For example, in order to keep the battery resistance low, it is desirable that the lithium-ion secondary battery 100A have low resistance to the transfer (diffusion) of lithium ions in the negative electrode active material layer 243A. For this purpose, it is desirable that the amount of the binder contained in the negative electrode active material layer 243A be small. However, when the amount of the binder contained the negative electrode active material layer 243A is small, the negative electrode active material layer 243A can peel off from the negative electrode current collector 241A in the use in which high-rate charge and discharge are repeated. If the negative electrode active material layer 243A peels off from the negative electrode current collector 241A, the transfer of electric charge between the negative electrode active material layer 243A and the negative electrode current collector 241A is inhibited, which can become a cause of an increase in battery resistance.

Thus, a conflicting problem with the negative electrode active material layer 243A is that the amount of binder needs to be small but the negative electrode active material layer 243A needs to be prevented from peeling from the negative electrode current collector 241A. As described above, in the lithium-ion secondary battery according to one embodiment of the present invention, the region A1 of the negative electrode active material layer 243A facing the positive electrode active material layer 223 contains the natural graphite in a larger proportion than the regions A2 and A3 not facing the positive electrode active material layer 223. The regions A2 and A3 not facing the positive electrode active material layer 223 contains the artificial graphite in a larger proportion than the region A1 facing the positive electrode active material layer 223.

In the present invention, the regions A2 and A3 of the negative electrode active material layer 243A not facing the positive electrode active material layer 223 contribute little particularly to the power characteristics especially in high-rate charge and discharge. Therefore, it is desirable that the amount of binder be increased in the regions A2 and A3 of the negative electrode active material layer 243A not facing the positive electrode active material layer 223. This makes the bonding between the negative electrode active material layer 243A and the negative electrode current collector 241A stronger in the regions A2 and A3 not facing the positive electrode active material layer 223. This makes it difficult to peel the negative electrode active material layer 243A from the negative electrode current collector 241A without causing almost any adverse effect on the absorption of lithium ions in the region A1 facing the positive electrode active material layer 223.

Thus, when the negative electrode active material layer 243A (see FIG. 11) is such that the proportion of natural graphite is made larger in the region A1 facing the positive electrode active material layer 223 and the proportion of artificial graphite is made large in the regions A2 and A3 not facing the positive electrode active material layer 223, it is possible to keep the reaction resistance in a low-temperature environment to be low and also keep the capacity retention ratio after storage in a high-temperature environment to be high. In this case, it is more desirable that the amount of binder be made greater in the regions A2 and A3 not facing the positive electrode active material layer 223 than in the region A1 facing the positive electrode active material layer 223. As a result, the negative electrode active material layer 243A can be prevented from peeling from the negative electrode current collector 241A, and the durability of the lithium-ion secondary battery 100A can be improved.

Furthermore, the present inventors have been paying special attention to the tap density of negative electrode active material particles in the case that natural graphite or artificial graphite is used for the negative electrode active material particles. For example, for desirable negative electrode active material particles used for the negative electrode active material layer 243A, the present inventors propose that the negative electrode active material particles have a 150 times tap density of equal to or greater than 1 g/cm$^3$.

Figure 16:
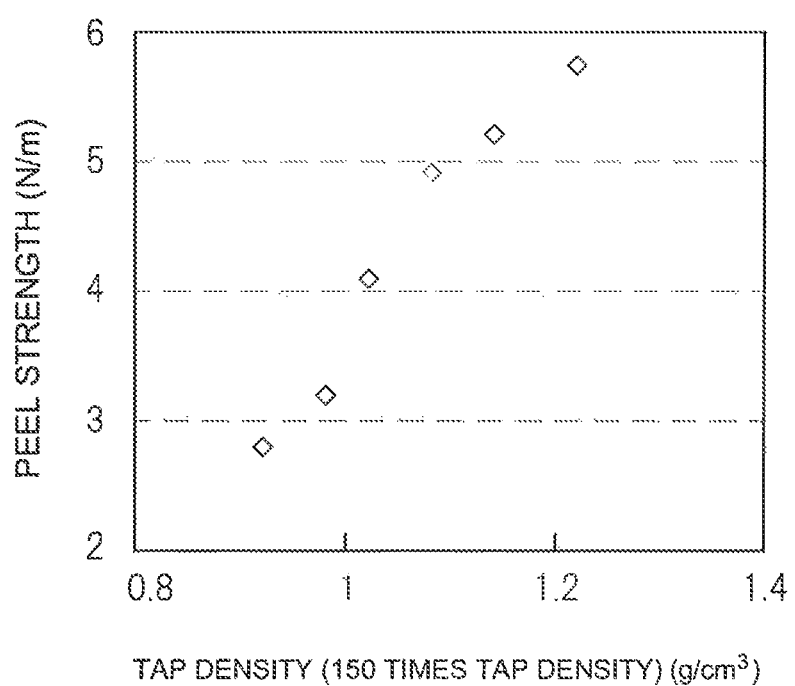
FIG. 16 is a graph illustrating the relationship between 150 times tap density and peel strength for negative electrode active material particles.
Figure 17:
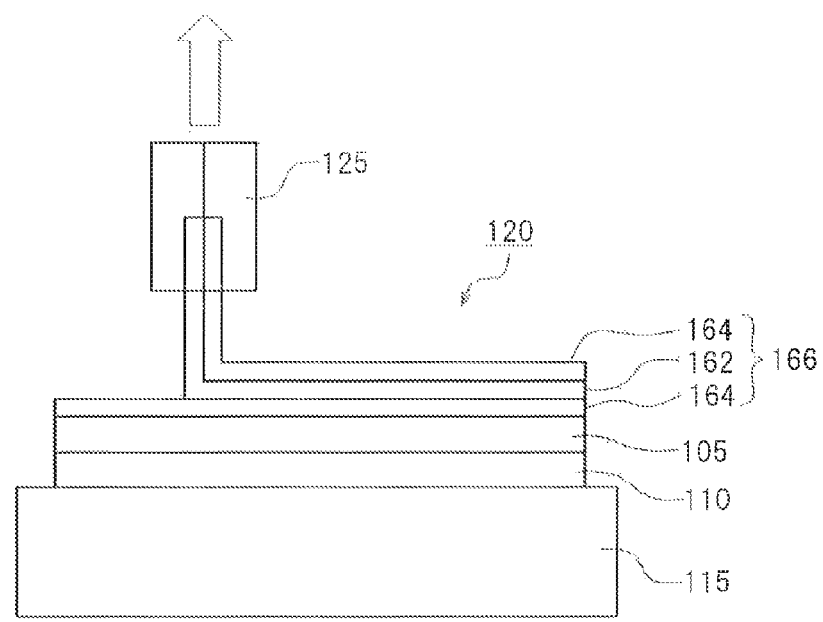
FIG. 17 is a view illustrating a 90-degree peel test method.

Herein, the 150 times tap density can be obtained by putting negative electrode active material particles in a graduated cylinder and tapping the graduated cylinder mechanically 150 times with a tap density tester to reduce the apparent volume of the negative electrode active material particles. FIG. 16 shows the relationship between the 150 times tap density and the peel strength for negative electrode active material particles. FIG. 17 is a view illustrating a 90-degree peel test method. Here, the peel strength was measured according to the 90-degree peel test method (JIS K 6854-1).

In this case, as illustrated in FIG. 17, an adhesive tape 105 (No. 3303N) made by Nitto Denko Corp. is affixed to a negative electrode active material layer 164 on one side of a negative electrode sheet 166, and a sample 120 is cut out into dimensions of width 15 mm×length 120 mm. In the sample 120, the adhesive tape 105 is peeled by 40 mm from one end thereof. Next, a double-sided tape (No. 501F) made by Nitto Denko Corp. is affixed to a stage. The sample 120 is affixed onto the double-sided tape 110 so that the adhesive tape 105 is placed face down. Next, the 40-mm peeled portion of the sample 120 is fixed to a chuck 125. Then, the chuck 125 is pulled at 90 degrees with respect to the stage 115, and a tensile load is measured at the time when the negative electrode active material layer 164 is peeled from the negative electrode current collector 162. A universal testing machine made by Minebea Co., Ltd. was used to pull the chuck 125. The pulling speed was 20 m/min. The peel strength N/m was obtained by dividing the obtained tensile load (N) by the width (15 mm) of the sample 120.

According to the knowledge obtained by the present inventors, as for the negative electrode active material layer 243A shown in FIGS. 9 and 10, the peel strength is high when the 150 times tap density of the negative electrode active material particles is equal to or greater than about 1 g/cm$^3$. Accordingly, it is desirable to use negative electrode active material particles having a 150 times tap density of equal to or greater than about 1 g/cm$^3$, more preferably equal to or greater than 1.08 g/cm$^3$, and still more preferably equal to or greater than 1.10 g/cm$^3$, for the negative electrode active material layer 243A of the lithium-ion secondary battery 100A described above. This ensures an appropriate peel strength for the negative electrode active material layer 243A. In other words, it is desirable that the natural graphite or the artificial graphite have a 150 times tap density of equal to or greater than about 1 g/cm$^3$, more preferably equal to or greater than 1.08 g/cm$^3$, and still more preferably equal to or greater than 1.10 g/cm$^3$. This makes it possible to keep sufficient peel strength for the negative electrode active material layer 243A and also reduce the amount of the binder contained in the negative electrode active material layer 243A.

Hereinabove, the lithium-ion secondary battery according to one embodiment of the present invention has been described. However, the lithium-ion secondary battery according to the present invention is not limited by any of the foregoing embodiments, and various modifications are possible.

Figure 18:
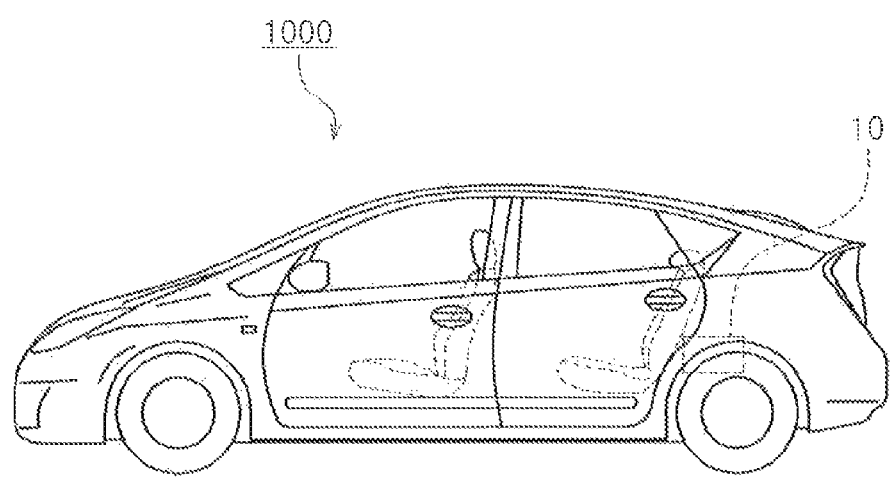
FIG. 18 is a side view schematically illustrating a vehicle (automobile) equipped with a non-aqueous electrolyte secondary battery (vehicle drive battery) according to one embodiment of the present invention.

The lithium-ion secondary battery disclosed herein can keep the reaction resistance to be low even in a low-temperature environment at about −30° C. Thus, it is possible to provide a non-aqueous electrolyte secondary battery, such as a lithium-ion secondary battery, that can exhibit high performance even in a low-temperature environment. Moreover, the lithium-ion secondary battery can keep the post-storage capacity retention ratio to be high even in a high-temperature environment at about 60° C. Therefore, the lithium-ion secondary battery 100A is particularly suitable for a vehicle drive battery, as illustrated in FIG. 18, which requires low resistance and high capacity in a variety of temperature environments. Here, the vehicle drive battery 10 may be in the form of battery module in which a plurality of the lithium-ion secondary batteries 100A are connected in series. Examples of a vehicle 1000 that has such a vehicle drive battery as its electric power source may include automobiles, particularly the automobiles having an electric motor, such as hybrid electric vehicles and electric vehicles.

REFERENCE SIGNS LIST

- 10—Vehicle drive battery
- 12—Traveling path
- 14—Electrode material coating device (coating device)
- 16—Drying oven
- 32—Supplying unit
- 34—Collecting unit
- 34b—Control unit
- 34c—Motor
- 41, 42—Flow passage
- 43, 44—Filter
- 45—Coating unit
- 46—Back-roll
- 47, 48—Tank
- 49, 50—Pump
- 60—Die
- 62—Discharge port
- 62a—Intermediate portion
- 62b1—Opposite side portion
- 100, 100A—Lithium-ion secondary battery
- 105—Adhesive tape
- 110—Double-sided tape
- 115—Stage
- 120—Sample
- 125—Chuck
- 162—Negative electrode current collector
- 164—Negative electrode active material layer
- 166—Negative electrode sheet
- 200, 200A—Wound electrode assembly
- 220—Positive electrode sheet
- 221—Positive electrode current collector
- 222—Uncoated portion
- 223—Positive electrode active material layer
- 240, 240A—Negative electrode sheet
- 241, 241A—Negative electrode current collector
- 242, 242A—Uncoated portion
- 243, 243A—Negative electrode active material layer
- 245—Gap
- 262, 264—Separator
- 280—Electrolyte solution
- 290—Charger
- 300—Battery case
- 320—Case main body
- 340—Lid
- 350—Filling port
- 352—Sealing cap
- 360—Safety vent
- 420—Electrode terminal
- 440—Electrode terminal
- 610—Positive electrode active material particle
- 620—Conductive agent
- 630—Binder
- 710—Negative electrode active material particle 730—Binder
1000—Vehicle
WL—Winding axis

The invention claimed is:

1. A lithium-ion secondary battery comprising:
   a positive electrode current collector;
   a positive electrode active material layer retained on the positive electrode current collector;
   a negative electrode current collector; and
   a negative electrode active material layer retained on the negative electrode current collector and disposed so as to cover the positive electrode active material layer,
   the negative electrode active material layer containing natural graphite and artificial graphite as negative electrode active material particles,
   the negative electrode active material layer comprising:
      a region facing the positive electrode active material layer and a region not facing the positive electrode active material layer, said regions contacting the negative electrode current collector and being disposed in a same plane extending in a direction normal to a direction in which the negative electrode active material layer and the negative electrode current collector are laminated, wherein
      the region facing the positive electrode active material layer contains the natural graphite in a larger proportion than the region not facing the positive electrode active material layer, and
      the region not facing the positive electrode active material layer contains the artificial graphite in a larger proportion than the region facing the positive electrode active material layer.

2. The lithium-ion secondary battery according to claim 1, wherein the region of the negative electrode active material layer facing the positive electrode active material layer contains the natural graphite in a weight proportion of equal to or greater than 90% of the total weight of the natural graphite and the artificial graphite.

3. The lithium-ion secondary battery according to claim 1, wherein the region of the negative electrode active material layer not facing the positive electrode active material layer contains the artificial graphite in a weight proportion of equal to or greater than 90% of the total weight of the natural graphite and the artificial graphite.

4. The lithium-ion secondary battery according to claim 1, wherein as determined by Raman spectroscopy, the natural graphite has an R value of from 0.2 to 0.6, and the artificial graphite has an R value of less than or equal to 0.2.

5. The lithium-ion secondary battery according to claim 4, wherein the ratio (Ra/Rb) of a mean R value (Ra) and a mean R value (Rb) is (Ra/Rb)≥1.2, where the mean R value (Ra) is the mean of the R values of the negative electrode active material particles used in the region of the negative electrode active material layer facing the positive electrode active material layer, and the mean R value (Rb) is the mean of the R values of the negative electrode active material particles used in the region of the negative electrode active material layer not facing the positive electrode active material layer.

6. The lithium-ion secondary battery according to claim 1, wherein:
   the negative electrode active material layer contains a binder; and
   the region of the negative electrode active material layer not facing the positive electrode active material layer contains the binder in a greater amount than the region of the negative electrode active material layer facing the positive electrode active material layer.

7. The lithium-ion secondary battery according to claim 1, wherein the natural graphite is at least partially covered with an amorphous carbon film.

8. A battery module comprising a plurality of the lithium-ion secondary batteries according to claim 1.

9. A vehicle drive battery comprising the lithium-ion secondary battery according to claim 1.

* * * * *